(12) United States Patent
Yan et al.

(10) Patent No.: US 12,413,463 B2
(45) Date of Patent: Sep. 9, 2025

(54) SIGNAL TRANSMISSION METHOD AND APPARATUS, REFLECTOR, AND RECEIVER

(71) Applicant: HUAWEI TECHNOLOGIES CO., LTD., Guangdong (CN)

(72) Inventors: Mao Yan, Chengdu (CN); Huang Huang, Chengdu (CN); Hua Shao, Shenzhen (CN); Kuandong Gao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 706 days.

(21) Appl. No.: 17/746,681

(22) Filed: May 17, 2022

(65) Prior Publication Data
US 2022/0278886 A1 Sep. 1, 2022

Related U.S. Application Data

(63) Continuation of application No. PCT/CN2019/119111, filed on Nov. 18, 2019.

(51) Int. Cl.
H04L 27/26 (2006.01)
H04B 7/145 (2006.01)
H04L 5/00 (2006.01)

(52) U.S. Cl.
CPC ....... H04L 27/26544 (2021.01); H04B 7/145 (2013.01); H04L 5/0051 (2013.01); H04L 5/0082 (2013.01)

(58) Field of Classification Search
None
See application file for complete search history.

(56) References Cited

U.S. PATENT DOCUMENTS

| | | | |
|---|---|---|---|
| 11,671,167 B2* | 6/2023 | Bengtsson | H04B 7/145 455/25 |
| 11,811,140 B2* | 11/2023 | Balakrishnan | H01Q 3/46 |
| 2005/0157684 A1* | 7/2005 | Ylitalo | H04L 1/0618 370/334 |

(Continued)

FOREIGN PATENT DOCUMENTS

| | | |
|---|---|---|
| CN | 103226170 A | 7/2013 |
| CN | 108151641 A | 6/2018 |

(Continued)

OTHER PUBLICATIONS

Liang et al., "Large Intelligent Surface/Antennas (LISA): Making Reflective Radios Smart," Journal of Communications and Information Networks, vol. 4, No. 2, Jun. 2019, 10 pages (Year: 2019).*

(Continued)

Primary Examiner — Faiyazkhan Ghafoerkhan
(74) Attorney, Agent, or Firm — Fish & Richardson P.C.

(57) ABSTRACT

This application provides a signal transmission method and apparatus, a reflector, and a receiver. In one example method, a reflector receives W excitation signals, where W exciters may be configured to carry data and a reference signal that are reflected by the reflector; and the reflector reflects data and L reference signals to a receiver, where the L reference signals are respectively carried in L excitation signals in the W excitation signals, where W and L are both integers greater than or equal to 1, and L is less than or equal to W.

11 Claims, 13 Drawing Sheets

(56) References Cited

U.S. PATENT DOCUMENTS

| | | | | |
|---|---|---|---|---|
| 2008/0079547 | A1* | 4/2008 | Alicot | H04B 1/525 340/10.3 |
| 2010/0240999 | A1* | 9/2010 | Droitcour | A61B 5/113 600/453 |
| 2016/0139254 | A1* | 5/2016 | Wittenberg | G01S 13/343 342/27 |
| 2017/0301988 | A1* | 10/2017 | Schuman | G01S 7/4026 |
| 2017/0343695 | A1* | 11/2017 | Stetson | G01V 3/101 |
| 2018/0062905 | A1* | 3/2018 | Schmidt | H04L 5/143 |
| 2018/0164407 | A1* | 6/2018 | Schuman | G01S 13/44 |
| 2020/0292684 | A1* | 9/2020 | Passoni | G01S 7/52004 |
| 2021/0004544 | A1* | 1/2021 | Zhang | H04B 7/15528 |
| 2021/0019482 | A1* | 1/2021 | Shakedd | G06K 7/10366 |
| 2021/0019483 | A1* | 1/2021 | Shakedd | G08B 13/2431 |
| 2021/0019585 | A1* | 1/2021 | Shakedd | G06F 21/602 |
| 2021/0019589 | A1* | 1/2021 | Shakedd | G06Q 10/087 |
| 2021/0019766 | A1* | 1/2021 | Shakedd | G06F 16/2379 |
| 2021/0020011 | A1* | 1/2021 | Shakedd | G06K 19/0724 |
| 2021/0020012 | A1* | 1/2021 | Shakedd | H04B 1/40 |
| 2022/0278886 | A1* | 9/2022 | Yan | H04L 5/0082 |

FOREIGN PATENT DOCUMENTS

| | | |
|---|---|---|
| CN | 110224965 A | 9/2019 |
| WO | 2004032349 A1 | 4/2004 |
| WO | 2017194333 A1 | 11/2017 |
| WO | 2019017755 A1 | 1/2019 |

OTHER PUBLICATIONS

3GPP TS 36.211 V15.7.0 (Sep. 2019), "3rd Generation Partnership Project; Technical Specification Group Radio Access Network; Evolved Universal Terrestrial Radio Access (E-UTRA); Physical channels and modulation (Release 15)," Sep. 2019, 240 pages.
3GPP TS 38.211 V15.7.0 (Sep. 2019), "3rd Generation Partnership Project; Technical Specification Group Radio Access Network; NR; Physical channels and modulation (Release 15)," Sep. 2019, 97 pages.
Azimi-Sadjadi et al., "A New Time delay Estimation in Subbands for Resolving Multiple Specular Reflections," IEEE Transactions on Signal Processing, vol. 46, No. 12, Dec. 1998, 6 pages.
PCT International Search Report and Written Opinion issued in International Application No. PCT/CN2019/119111 on Aug. 19, 2020, 13 pages (with English translation).
EPO Partial Supplementary European Search Report issued in European Application No. 19953167.4 on Sep. 9, 2022, 12 pages.
Liang et al., "Large Intelligent Surface/Antennas (LISA): Making Reflective Radios Smart," Journal of Communications and Information Networks, vol. 4, No. 2, Jun. 2019, 10 pages.
3GPP TS 38.211 V15.3.0, "3rd Generation Partnership Project; Technical Specification Group Radio Access Network; NR; Physical channels and modulation (Release 15)," Sep. 2018, 96 pages.
3GPP TS 38.212 V15.3.0, "3rd Generation Partnership Project; Technical Specification Group Radio Access Network; NR; Multiplexing and channel coding (Release 15)," Sep. 2018, 99 pages.
Office Action in Korean Appln. No. 10-2022-7018943, mailed on Jan. 25, 2024, 25 pages (with English translation).

* cited by examiner

SIGNAL TRANSMISSION METHOD AND APPARATUS, REFLECTOR, AND RECEIVER

CROSS-REFERENCE TO RELATED APPLICATIONS

This application is a continuation of International Application No. PCT/CN2019/119111, filed on Nov. 18, 2019. The disclosure of which is hereby incorporated by reference in its entirety.

TECHNICAL FIELD

This application relates to the communication field, and more specifically, to a signal transmission method and apparatus, a reflector, and a receiver.

BACKGROUND

Backscatter communication does not require a dedicated radio frequency component that needs to consume a large amount of power. Backscatter communication is a technology in which energy may be obtained by receiving a radio signal through an antenna, and communication is performed by reflecting the radio signal received by an antenna end. Backscatter communication is also a passive communication technology with extremely low power consumption and low costs that is applicable to Internet of Things applications.

In existing backscatter communication, reflection is based on a data packet, and each piece of reflected data has a header (preamble). A receive end usually performs channel estimation by using a preamble sequence of a data packet header. However, in this manner, channel estimation performance is poor.

In this case, in backscatter communication, how to improve channel estimation performance of the receive end is a problem to be resolved.

SUMMARY

This application provides a signal transmission method and apparatus, a reflector, and a receiver, to improve channel estimation and data demodulation performance.

According to a first aspect, a signal transmission method is provided. The method may be performed by a reflector, or may be performed by a chip, a chip system, or a circuit disposed in the reflector. This is not limited in this application.

The method may include: The reflector receives W excitation signals; and the reflector reflects data and L reference signals to a receiver, where the L reference signals are respectively carried in L excitation signals in the W excitation signals, where W and L are both integers greater than or equal to 1, and L is less than or equal to W.

Optionally, that the reference signal is carried in the excitation signal may be understood as that one reference signal may be loaded onto each excitation signal. Being loaded in a signal domain, for example, may be embodied as multiplication of two signals.

Based on the foregoing technical solution, the reference signal is designed in backscatter communication, that is, when reflecting the data, the reflector reflects the reference signal, so that channel estimation performance of a receive end can be effectively improved, and a gain can be improved.

With reference to the first aspect, in some implementations of the first aspect, the W excitation signals include T excitation signals, and the T excitation signals do not carry the reference signal and/or the data, where T is an integer greater than 0.

For example, the T excitation signals do not carry the reference signal. Alternatively, the T excitation signals do not carry the reflected data. Alternatively, the T excitation signals do not carry the reference signal or the reflected data.

The W excitation signals include the T excitation signals, and the T excitation signals do not carry the reference signal and/or the reflected data. Alternatively, this may be understood as that in L+T reference signals, the L excitation signals are used to carry the L reference signals, and the T reference signals are not sent. Alternatively, this may be understood as that all L+T excitation signals are used to carry reference signals, the reflector reflects the reference signals by using the L excitation signals, and no signal is reflected on the T excitation signals.

Based on the foregoing technical solution, a time unit in which the T excitation signals are located may be used to estimate a channel between an exciter and the receiver. That is, in this case, there is no reflected signal in a received signal, or there is only a low-power reflected signal in a received signal. In this way, the receiver is supported to cancel the excitation signal on other received signals having a reflected reference signal and/or a reflected data signal by using the estimated channel between the exciter and the receiver, and then obtain the data of the reflector.

With reference to the first aspect, in some implementations of the first aspect, W and L are integers greater than or equal to 2.

That is, the reflector reflects at least two reference signals, or reflects the reference signals in at least two time units.

With reference to the first aspect, in some implementations of the first aspect, T and L meet any one of the following: T is greater than L, T is equal to L, or T is less than L.

With reference to the first aspect, in some implementations of the first aspect, when T is equal to L, locations of the reference signals and the excitation signals in the T excitation signals in a time domain resource alternately appear.

With reference to the first aspect, in some implementations of the first aspect, locations of the T excitation signals in a time domain resource are before locations of the L excitation signals in the time domain resource; or locations of the T excitation signals in a time domain resource are after locations of the L excitation signals in the time domain resource.

With reference to the first aspect, in some implementations of the first aspect, an interval between the locations of the T excitation signals in the time domain resource is less than an interval between the locations of the L excitation signals in the time domain resource; or an interval between the locations of the T excitation signals in the time domain resource is greater than an interval between the locations of the L excitation signals in the time domain resource.

For example, that an interval between the locations of the T excitation signals in the time domain resource is less than an interval between the locations of the L excitation signals in the time domain resource may also be understood as that a time interval at which "non-reflected" signals appear may be shorter than a time interval at which reference signals appear. That is, the "non-reflected" signals appear more closely in terms of time (for example, a backscatter communication slot, a backscatter communication subframe, or a backscatter communication frame). For example, an interval between "non-reflected" signals that are adjacent in terms of time is less than an interval between reference signals that are adjacent in terms of time. In this case, the excitation signal can be estimated more accurately, thereby reducing interference caused by a residual excitation signal.

For example, that an interval between the locations of the T excitation signals in the time domain resource is greater than an interval between the locations of the L excitation signals in the time domain resource may also be understood as that a time interval at which "non-reflected" signals appear may be longer than a time interval at which reference signals appear. That is, the "non-reflected" signals appear more sparsely in terms of time (for example, a backscatter communication slot, a backscatter communication subframe, or a backscatter communication frame). For example, an interval between "non-reflected" signals that are adjacent in terms of time is greater than an interval between reference signals that are adjacent in terms of time. In this case, a channel through which the reflected data passes can be estimated more accurately, thereby improving detection performance.

For example, the interval between the locations of the T excitation signals in the time domain resource may alternatively be equal to the interval between the locations of the L excitation signals in the time domain resource.

With reference to the first aspect, in some implementations of the first aspect, the L reference signals are carried in L time domain units, and each time domain unit carries one reference signal; and two reference signal symbols carried in two adjacent time domain units are opposite.

Two adjacent reference signals are opposite numbers to each other, that is, symbols are opposite.

Based on the foregoing technical solution, in a case in which two reference signals are opposite numbers to each other, a difference between two reflected symbols can be supported, to eliminate an excitation signal. Such a design in which adjacent symbols are opposite can make channel estimation corresponding to the reflected data more accurate (that is, a signal-to-noise ratio is higher).

With reference to the first aspect, in some implementations of the first aspect, the L time domain units meet any one of the following: intervals between the L time domain units are the same; intervals between the L time domain units are different; or the L time domain units are consecutive.

For example, the interval may be 0, or may be greater than 0.

Based on the foregoing technical solution, an interval placement manner in which there is an interval between the L time domain units is similar to an existing LTE reference signal placement manner, to provide better compatibility. A consecutive placement manner is similar to a placement manner of reference signals in NR. In addition, in the consecutive placement manner, because a time interval between time locations of reference signals is shorter, the reference signals are less affected by a time-varying characteristic of a channel. Therefore, this helps eliminate the excitation signal when the data of the reflector is recovered.

With reference to the first aspect, in some implementations of the first aspect, before that the reflector reflects data and L reference signals to a receiver, the method further includes: The reflector receives configuration information, where the configuration information includes one or more of the following information: a format of the reference signal, the location of the reference signal in the time domain resource, a quantity L of the reference signals, a location of an excitation signal that does not carry the reference signal and/or the data in the time domain resource, a quantity of excitation signals that do not carry the reference signal and/or the data, a location of an excitation signal that carries the reference signal in the time domain resource, a quantity of excitation signals that carry the reference signal, and a demodulation scheme of the data.

With reference to the first aspect, in some implementations of the first aspect, each excitation signal carries one reference signal.

In other words, one reference signal is loaded onto each excitation signal.

For example, a time unit of a reflected signal (that is, including the reflected data and the reference signal) may be the same as that of the excitation signal, or may be a fractional multiple or an integer multiple of a time unit of the excitation signal.

With reference to the first aspect, in some implementations of the first aspect, the reference signal is used by the receiver to cancel the excitation signal and/or demodulate the data of the reflector.

With reference to the first aspect, in some implementations of the first aspect, that the reflector receives W excitation signals includes: The reflector receives the W excitation signals in a backscatter communication slot.

According to a second aspect, a signal transmission method is provided. The method may be performed by a reflector, or may be performed by a chip, a chip system, or a circuit disposed in the reflector. This is not limited in this application.

The method may include: The reflector receives W excitation signals in a backscatter communication slot; and the reflector reflects, to a receiver, at least two of the following: L reference signals, T excitation signals, and data, where the L reference signals are carried in L excitation signals in the W excitation signals, the T excitation signals belong to the W excitation signals, and the T excitation signals do not carry the reference signal and/or the data, where W and L are both integers greater than or equal to 1, T is an integer greater than or equal to 0, and L and T are both less than W.

For example, the T excitation signals do not carry the reference signal.

For example, the T excitation signals do not carry the reflected data.

For example, the T excitation signals do not carry the reference signal or the reflected data.

It should be understood that carrying may also be referred to as loading. Being carried or loaded in a signal domain, for example, may be embodied as multiplication of two signals.

For example, the T excitation signals may also be referred to as "non-reflected" signals. That is, the reflector reflects, to the receiver, at least two of the following: "reflected" reference signals (that is, the L reference signals), "non-reflected" signals, and the data. The "non-reflected" signal may indicate that the reference signal and/or the data are/is not reflected. Alternatively, this may be understood as that after the reflector receives the W excitation signals, the reflector may reflect the data on some excitation signals, reflect the reference signal on some excitation signals, and reflect neither the reference signal nor the data on some excitation signals.

For example, the backscatter communication slot indicates a time unit used for backscatter communication, and may include time of at least one backscatter communication symbol (that is, time required by the reflector to complete transmission of one data symbol). Time in which one reflector completes one complete backscatter communication process may be one or more backscatter communication slots and/or time of several backscatter communication symbols.

Based on the foregoing technical solution, a time unit in which the T excitation signals are located may be used to estimate a channel between an exciter and the receiver. That is, in this case, there is no reflected signal in a received signal, or there is only a low-power reflected signal in a received signal. In this way, the receiver is supported to cancel the excitation signal on other received signals having a reflected reference signal and/or a reflected data signal by using the estimated channel between the exciter and the receiver, and then obtain the data of the reflector. Therefore, not only channel estimation performance of a receive end can be improved, but also the data can be better received, thereby improving data demodulation performance.

With reference to the second aspect, in some implementations of the second aspect, W and L are integers greater than or equal to 2.

With reference to the second aspect, in some implementations of the second aspect, T and L meet any one of the following: T is greater than L, T is equal to L, or T is less than L.

With reference to the second aspect, in some implementations of the second aspect, when T is equal to L, locations of the reference signals and the excitation signals in the T excitation signals in a time domain resource alternately appear.

With reference to the second aspect, in some implementations of the second aspect, locations of the T excitation signals in a time domain resource are before locations of the L excitation signals in the time domain resource; or locations of the T excitation signals in a time domain resource are after locations of the L excitation signals in the time domain resource.

With reference to the second aspect, in some implementations of the second aspect, an interval between the locations of the T excitation signals in the time domain resource is less than an interval between the locations of the L excitation signals in the time domain resource; or an interval between the locations of the T excitation signals in the time domain resource is greater than an interval between the locations of the L excitation signals in the time domain resource.

With reference to the second aspect, in some implementations of the second aspect, the L reference signals are carried in L time domain units, and each time domain unit carries one reference signal; and two reference signal symbols carried in two adjacent time domain units are opposite.

With reference to the second aspect, in some implementations of the second aspect, the L time domain units meet any one of the following: intervals between the L time domain units are the same; intervals between the L time domain units are different; or the L time domain units are consecutive.

With reference to the second aspect, in some implementations of the second aspect, before that the reflector reflects data and L reference signals to a receiver, the method further includes: The reflector receives configuration information, where the configuration information includes one or more of the following information: a format of the reference signal, the location of the reference signal in the time domain resource, a quantity L of the reference signals, a location of an excitation signal that does not carry the reference signal and/or the data in the time domain resource, a quantity of excitation signals that do not carry the reference signal and/or the data, a location of an excitation signal that carries the reference signal in the time domain resource, a quantity of excitation signals that carry the reference signal, and a demodulation scheme of the data.

With reference to the second aspect, in some implementations of the second aspect, each excitation signal carries one reference signal.

With reference to the second aspect, in some implementations of the second aspect, the reference signal is used by the receiver to cancel the excitation signal and/or demodulate the data of the reflector.

With reference to the second aspect, in some implementations of the second aspect, that the reflector receives W excitation signals includes: The reflector receives the W excitation signals in a backscatter communication slot.

According to a third aspect, a signal transmission method is provided. The method may be performed by a receiver, or may be performed by a chip, a chip system, or a circuit disposed in the receiver. This is not limited in this application.

The method may include: The receiver receives a plurality of signals, where each signal includes data and L reference signals, and the L reference signals are carried in L excitation signals; and the receiver demodulates the plurality of signals.

Based on the foregoing technical solution, the reference signal is designed in backscatter communication, that is, when reflecting the data, a reflector reflects the reference signal, so that channel estimation performance of a receive end can be effectively improved, and a gain can be improved.

With reference to the third aspect, in some implementations of the third aspect, the plurality of signals include a first signal and a second signal, and time domain units carrying the first signal and the second signal are adjacent. That the receiver demodulates the plurality of signals includes: The receiver performs subtraction processing on the first signal and the second signal.

Based on the foregoing technical solutions, interference caused by the excitation signal to a reflected data signal can be greatly reduced, and demodulation performance can be improved.

According to a fourth aspect, a signal transmission apparatus is provided. The apparatus is configured to perform the method provided in the first aspect or the second aspect. Specifically, the apparatus may include a module, such as a circuit, configured to perform the method provided in the first aspect or the second aspect.

Optionally, the apparatus is a reflector.

According to a fifth aspect, a signal transmission apparatus is provided. The apparatus is configured to perform the method provided in the third aspect. Specifically, the apparatus may include a module, such as a circuit, configured to perform the method provided in the third aspect.

Optionally, the apparatus is a receiver.

According to a sixth aspect, a signal transmission apparatus is provided. The apparatus includes a processor. The processor is coupled to a memory, and may be configured to execute instructions in the memory, to implement the method according to any one of the first aspect or the second aspect and the possible implementations of the first aspect or the second aspect. Optionally, the apparatus further includes the memory. Optionally, the apparatus further includes a communication interface, the processor is coupled to the communication interface, and the communication interface is configured to input and/or output information. The information includes at least one of the instructions and data.

In an implementation, the apparatus is a reflector. When the apparatus is the reflector, the communication interface may be a transceiver or an input/output interface.

In another implementation, the apparatus is a chip or a chip system. When the apparatus is the chip or the chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the apparatus is a chip or a chip system disposed in a reflector.

Optionally, the transceiver may be a transceiver circuit. Optionally, the input/output interface may be an input/output circuit.

According to a seventh aspect, a signal transmission apparatus is provided. The apparatus includes a processor. The processor is coupled to a memory, and may be configured to execute instructions in the memory, to implement the method according to any one of the third aspect and the possible implementations of the third aspect. Optionally, the apparatus further includes the memory. Optionally, the apparatus further includes a communication interface, the processor is coupled to the communication interface, and the communication interface is configured to input and/or output information. The information includes at least one of the instructions and data.

In an implementation, the apparatus is a receiver. When the apparatus is the receiver, the communication interface may be a transceiver or an input/output interface.

In another implementation, the apparatus is a chip or a chip system. When the apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

In another implementation, the apparatus is a chip or a chip system disposed in a receiver.

Optionally, the transceiver may be a transceiver circuit. Optionally, the input/output interface may be an input/output circuit.

According to an eighth aspect, a computer-readable storage medium is provided. The computer-readable storage medium stores a computer program. When the computer program is executed by an apparatus, the apparatus is enabled to implement the method according to any one of the first aspect or the second aspect and the possible implementations of the first aspect or the second aspect.

According to a ninth aspect, a computer-readable storage medium is provided. The computer-readable storage medium stores a computer program. When the computer program is executed by an apparatus, the apparatus is enabled to implement the method according to any one of the third aspect and the possible implementations of the third aspect.

According to a tenth aspect, a computer program product including instructions is provided. When the instructions are executed by a computer, an apparatus is enabled to implement the method provided in the first aspect or the second aspect.

According to an eleventh aspect, a computer program product including instructions is provided. When the instructions are executed by a computer, an apparatus is enabled to implement the method provided in the third aspect.

According to a twelfth aspect, a reflection system is provided. The system includes the foregoing reflector and exciter; the foregoing reflector and receiver; or the foregoing reflector, receiver, and exciter.

DESCRIPTION OF EMBODIMENTS

The following describes technical solutions of this application with reference to the accompanying drawings.

Unless otherwise defined, all technical and scientific terms used in this specification have a same meaning as that usually understood by a person skilled in the art of this application. The terms used in the specification of this application are merely for the purpose of describing specific embodiments, and are not intended to limit this application.

To better understand embodiments of this application, the following first describes a communication system to which embodiments of this application are applicable and related concepts.

Figure 1:
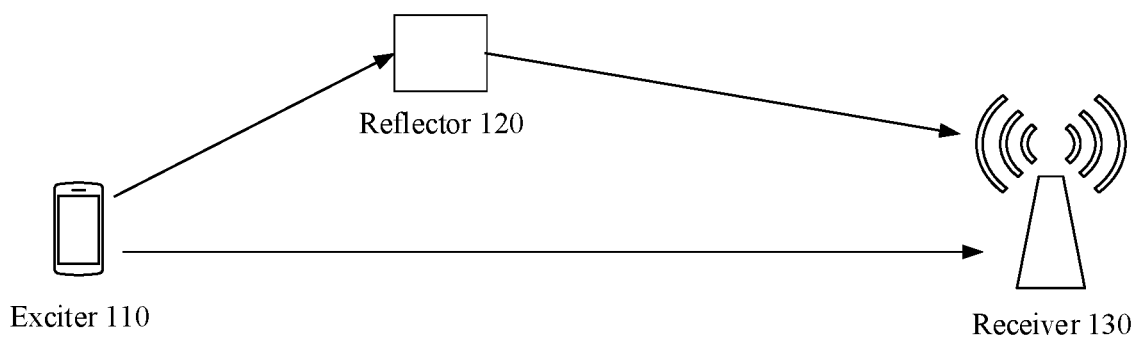
FIG. 1 and FIG. 2 are schematic diagrams of communication systems according to this application.
Figure 2:
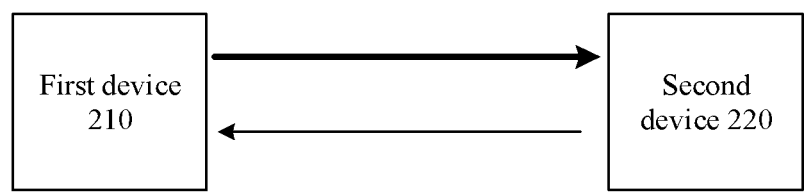

FIG. 1 and FIG. 2 are schematic architectural diagrams of backscatter communication to which an embodiment of this application may be applied.

Backscatter communication does not require a dedicated radio frequency component that needs to consume a large amount of power. Backscatter communication is a technology in which energy may be obtained by receiving a radio signal through an antenna (or by relying on a limited power supply), and communication is performed by reflecting the radio signal received by an antenna end. Backscatter communication is also a passive communication technology with extremely low power consumption and low costs that is applicable to Internet of Things applications.

In a structure shown in FIG. 1, a backscatter communication system includes an exciter 110, a reflector 120, and a receiver 130. The exciter 110 may send a radio signal, and the radio signal may also be referred to as an energy signal. The reflector 120 receives the radio signal of the exciter 110, and may reflect the signal. When reflecting the signal, the reflector 120 may include a signal of the reflector 120 in the reflected signal. The receiver 130 may demodulate data carried on the reflected signal.

In a structure shown in FIG. 2, the backscatter communication system includes a first device 210 and a second device 220. The first device may include an exciter and a receiver, that is, the exciter and the receiver may be one device, or the exciter and the receiver may be integrated into a same device. It may be understood that the first device may include both a function of the exciter and a function of the receiver. The second device 220 may be a reflector.

The first device 210 may send a radio signal, and the radio signal may also be referred to as an energy signal. The second device 220 receives the radio signal of the first device 210, and may reflect the signal. When reflecting the signal, the second device 220 may include a signal of the second device 220 in the reflected signal. The first device 210 may demodulate data carried on the reflected signal.

For example, in the system shown in FIG. 1 or FIG. 2, data reflected by the reflector may include an identifier, for example, a radio frequency identification (RFID), or may include other data, for example, data such as a temperature and humidity collected by a sensor.

It should be understood that FIG. 1 and FIG. 2 are merely examples for description, and this application is not limited thereto. For example, embodiments of this application may be further applied to any communication scenario in which backscatter communication can be performed.

It should be further understood that, based on a correspondence between an exciter, a receiver and a long term evolution (LTE), fifth generation (5th generation, 5G), or new radio (NR) network, in this application, there are at least the following four cases for the exciter and the receiver: The exciter is a terminal device, and the receiver is a network device; the exciter is a network device, and the receiver is a terminal device; the exciter and the receiver are both terminal devices; and the exciter and the receiver are both network devices.

It should be further understood that the terminal device (for example, the receiver and/or the exciter) mentioned in embodiments of this application may also be referred to as user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice/data connectivity for user, for example, a handheld device or a vehicle-mounted device that has a wireless connection function. Currently, some examples of the terminal are a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, and a terminal device in a future evolved public land mobile network (PLMN). This is not limited in embodiments of this application.

By way of example but not limitation, in embodiments of this application, the terminal device may alternatively be a wearable device. The wearable device may also be referred to as a wearable intelligent device, and is a general term of wearable devices, such as glasses, gloves, watches, clothes, and shoes, that are developed by applying a wearable technology to intelligent designs of daily wearing. The wearable device is a portable device that can be directly worn by a user or integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the terminal device in embodiments of this application may alternatively be a terminal device in an Internet of Things (IoT) system. IoT is an important part of future development of information technologies. A main technical feature of the IoT is connecting things to networks using communication technologies, to implement an intelligent network for interconnection between persons and machines, and between things. In embodiments of this application, an IoT technology may implement massive connections, deep coverage, and terminal power saving by using, for example, a narrowband (NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

In addition, the network device (for example, the receiver and/or the exciter) mentioned in embodiments of this application may be a device configured to communicate with the terminal device (for example, the exciter and/or the receiver). The network device may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

The network device in embodiments of this application may be a device in a wireless network, for example, a radio access network (RAN) node that connects a terminal to the wireless network. Currently, some examples of the RAN node are a next generation NodeB gNB, a transmission reception point (TRP), an evolved NodeB (eNB), a home base station, a baseband unit (BBU), and an access point (AP) in a Wi-Fi system.

In a network structure, the network device may include a centralized unit (CU) node or a distributed unit (DU) node, a RAN device including a CU node and a DU node, or a RAN device including a control plane CU node (CU-CP node), a user plane CU node (CU-UP node), and a DU node.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that is in the terminal device or the network device and that can invoke and execute the program.

In addition, in embodiments of this application, any one of an exciter, a reflector, and a receiver may be explained as any one of a network device, a terminal device, an IoT device, a device, and the like in a 3rd generation partnership project (3GPP) network. Alternatively, any one of an exciter, a reflector, and a receiver may be explained as a reader or a tag in a radio frequency identification (RFID) network. Alternatively, any one of an exciter, a reflector, and a receiver may be explained as a dedicated receiver. The dedicated receiver may represent a device dedicated to receiving a reflected signal, may be connected to the network device, and may also be directly connected to a cellular network. Alternatively, any one of an exciter, a reflector, and a receiver may be explained as a dedicated exciter. The dedicated exciter may represent a device dedicated to sending an excitation signal, may be connected to the network device, and may also be directly connected to a cellular network. It should be understood that this application does not exclude a case in which a new device type/name is defined in a future protocol.

In addition, the exciter may also be referred to as a helper, an interrogator, a reader, user equipment, or the like. The reflector may also be referred to as a backscatter device, a battery-less device, a passive device, a semi-passive device, a scatter signal device (ambient signal device), a tag, or the like. Backscatter communication may also be referred to as passive communication, battery-less communication, scatter communication (ambient communication), or the like. It should be understood that this application does not exclude a case in which a new name is defined in a future protocol.

For ease of understanding of embodiments of this application, the following first briefly describes several terms in this application.

1. Modulation and Demodulation

Modulation refers to a process in which information of a signal source is processed and added to a carrier, to make the information be in a form suitable for channel transmission. Different modes may correspond to different modulation methods. The modulation method may include but is not limited to multi-carrier modulation, single-carrier modulation, phase-shift keying (PSK) modulation, amplitude-shift keying (ASK) modulation, and the like.

Demodulation is a reverse process of modulation, in which original data bits or symbols are recovered from a signal. Demodulation may also be referred to as detection.

2. Reference Signal (RS)

The reference signal may include but is not limited to a demodulation reference signal (DMRS), a channel state information reference signal (CSI-RS), a phase tracking reference signal (PTRS), and the like. Different reference signals have different functions. For example, a DMRS and a CSI-RS may be used to obtain channel information, and a PTRS may be used to obtain phase variation information.

Based on the reference signal, a transmit end or a receive end may deduce, based on a known or predetermined rule, a time and frequency location of a signal, a signal or a symbol carried on time and frequency resources, and the like. The reference signal may represent a known signal provided by the transmit end to the receive end for channel estimation or channel sounding. In other words, the reference signal represents a known signal that is used to obtain impact, on a signal, of an external environment (for example, a spatial channel, or non-ideality of a transmit or receive end device) during transmission, and is usually used to assist in signal demodulation and detection. For example, a DMRS and a CSI-RS are used to obtain channel information, and a PTRS is used to obtain phase variation information.

3. Orthogonal Frequency Division Multiplexing (OFDM)

OFDM is a multicarrier transmission waveform of frequency division multiplexing (FDM), and signals participating in multiplexing (which, for example, may also be referred to as carriers or subcarriers) are orthogonal. In a possible OFDM technology, a high-speed data stream may be converted into a plurality of parallel low-speed data streams through serial/parallel conversion, and then the parallel low-speed data streams are allocated to several subcarriers of different frequencies for transmission. The OFDM technology utilizes subcarriers that are orthogonal to each other, so that spectra of the subcarriers are overlapping. In a conventional FDM multicarrier modulation system, a guard interval is required between subcarriers. Compared with the conventional FDM multicarrier modulation system, the OFDM technology can improve spectrum utilization.

4. Subcarrier

In a multicarrier transmission waveform, a transmitted signal is a bandwidth signal. The bandwidth signal includes many signals of different frequencies, and intervals between these frequencies are the same. These signals of different frequencies are referred to as subcarriers. Data transmitted between the network device and the terminal device is modulated onto these subcarriers, and these subcarriers may be orthogonal within a period of time.

Figure 3:
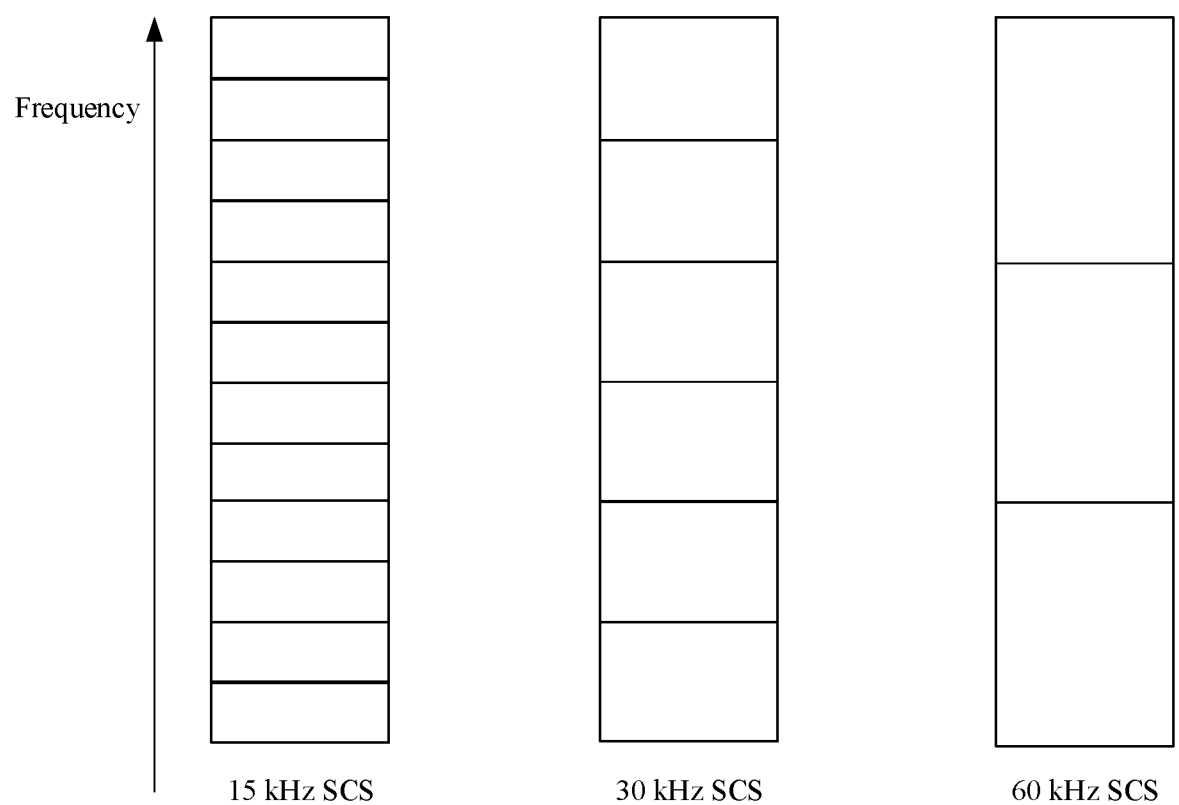
FIG. 3 is a schematic diagram of a subcarrier according to an embodiment of this application.

FIG. 3 is used as an example. When a subcarrier spacing (SCS) is 15 kHz, 30 kHz, or 60 kHz, each space in frequency domain may be one subcarrier, and may be used to transmit data.

5. Scrambling

Scrambling is a digital signal processing method. For example, an exclusive OR operation is performed on a data signal and a specific sequence signal, or a modulo-2 operation is performed after a data signal and a specific sequence signal are added, to obtain anew signal. Compared with an original signal, the new signal is scattered in terms of time and frequency. Interference randomization can be implemented through scrambling. The sequence signal is a scrambling signal. The sequence signal may be a known binary sequence signal, or may be a sequence signal generated based on some information. For example, the information may include but is not limited to a cell identifier and/or a terminal identifier. Data information may include, for example, data information obtained after original data information bits are encoded. Alternatively, data information may include data information that is not encoded. Alternatively, data information may include sequence information, for example, preamble information of a frame header and random access preamble information.

6. Pseudo-Random Signal

A pseudo-random signal may also be referred to as a pseudo-noise (PN) sequence or a pseudo-random code. The pseudo-random signal has some statistical characteristics similar to those of random noise, and may be repeatedly generated and processed. The pseudo-random signal may be generated by any one of the following sequences: an m-sequence, a Gold sequence, a quadratic residue sequence, a double-prime sequence, a ZC sequence, a Frank sequence, a Golomb sequence, a Chirp sequence, a P4 sequence, or the like.

7. Time-Frequency Resource

In embodiments of this application, data or information may be carried on a time-frequency resource, and the time-frequency resource may include a resource in time domain and a resource in frequency domain. In time domain, the time-frequency resource may include one or more time domain units (which may also be referred to as time units or time domain units). In frequency domain, the time-frequency resource may include one or more frequency domain units.

One time domain unit may be one symbol, one mini-slot, one slot, or one subframe. Duration of one subframe in time domain may be one millisecond (ms). One slot includes seven or 14 symbols. One mini-slot may include at least one symbol (for example, two symbols, four symbols, seven symbols, 14 symbols, or any other quantity of symbols fewer than or equal to 14 symbols). The listed values of the time domain unit are merely for ease of understanding of the solutions of this application, and should not be understood as a limitation on this application. It may be understood that the time domain unit may have another value. This is not limited in this application.

A backscatter communication slot indicates a time unit used for backscatter communication, and may include time of at least one backscatter communication symbol (that is, time required by a reflector to complete transmission of one data symbol). Time in which one reflector completes one complete backscatter communication process may be one or more backscatter communication slots and/or time of several backscatter communication symbols.

A frequency domain unit may be a resource element (RE), a resource block (RB), a resource block group (RBG), a predefined subband, a precoding resource block group (PRG), a bandwidth part (BWP), a carrier, or a serving cell.

In embodiments of this application, the time unit, the time domain unit, and the time domain unit sometimes alternate with each other in time domain, and meanings of the time unit, the time domain unit, and the time domain unit are the same.

In embodiments of this application, "data" or "information" may be understood as a bit generated after an information block is encoded, or "data" or "information" may be understood as a modulation symbol generated after an information block is encoded and modulated.

Generally, a signal sent by an exciter has two functions: charging and acting as a reflected data carrier. From a perspective of an occupied frequency band width, the signal sent by the exciter may be a monophonic signal (that is, a consecutive sine wave) or a single-carrier signal, or may be a multi-tone signal (for example, a signal having a specific bandwidth). Generally, the signal sent by the exciter is a known signal or a data signal sent to a receiver. In a backscatter communication system, a reader/writer (sending an excitation signal) sends a monophonic signal that is also referred to as a continuous wave (CW) and does not carry any data. When the reflector reflects data, original data is directly carried in the signal.

In an existing reflection system, a reflector (for example, a tag) reflects an ASK signal (or an on-off keying (OOK) signal). Reflection is based on a data packet, and each piece of reflected data has a header (preamble) for a receive end (that is, the reader/writer) to perform synchronization. Although a preamble sequence based on a data packet header may be used for channel estimation, performance is poor and overheads are high.

In view of this, this application provides a method, to improve performance of channel estimation and reflected data detection.

The following describes in detail embodiments provided in this application with reference to the accompanying drawings.

Figure 4:
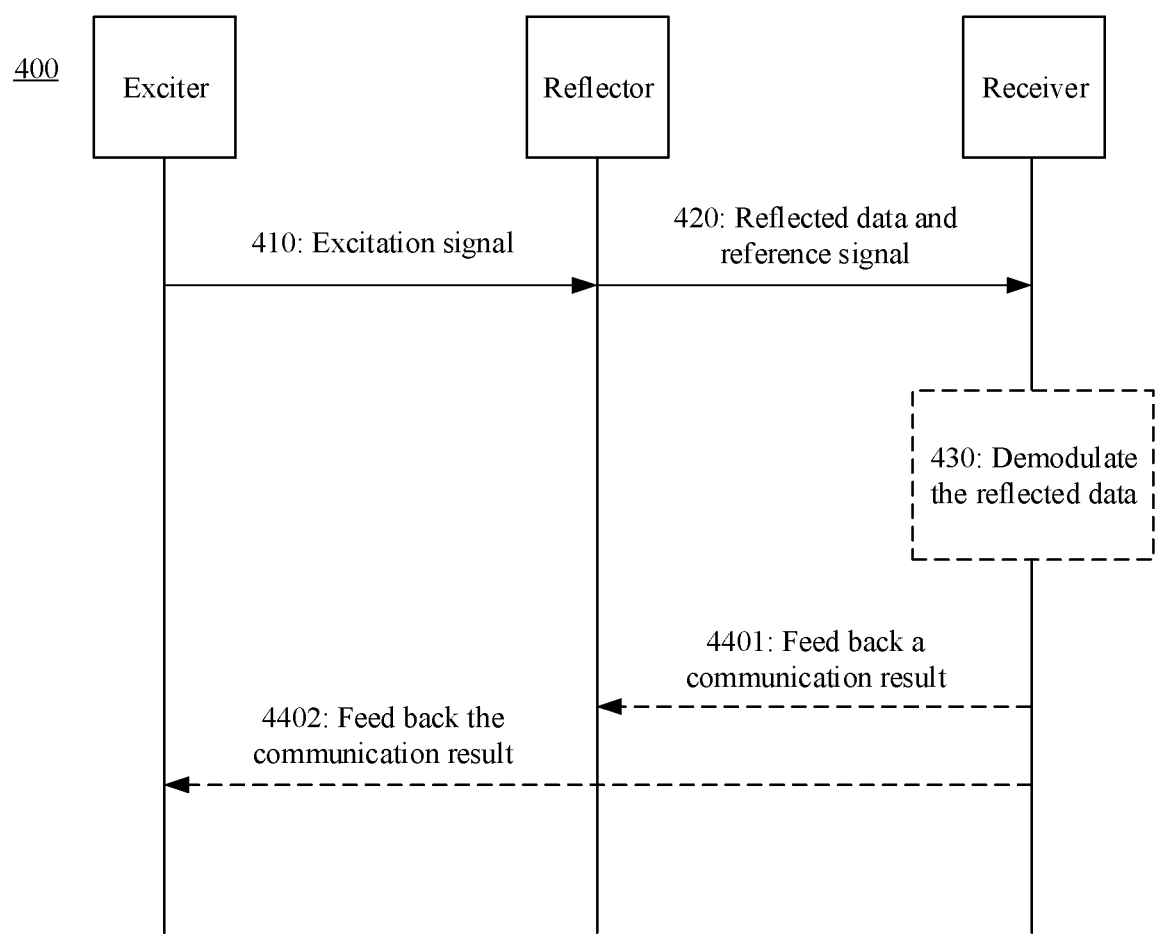
FIG. 4 is a schematic interaction diagram of a signal transmission method according to an embodiment of this application.

FIG. 4 is a schematic interaction diagram of a signal transmission method 400 according to an embodiment of this application. The method 400 may include the following steps.

410: An exciter sends an excitation signal to a reflector. Accordingly, the reflector receives the excitation signal.

That is, the exciter sends W excitation signals to the reflector, and the reflector receives the W excitation signals. Alternatively, it may be understood that the reflector receives the W excitation signals in a backscatter communication slot. W is an integer greater than or equal to 1.

It should be understood that the exciter and the reflector may be different devices, or may be integrated into a same device. This is not limited herein. For ease of understanding, FIG. 4 shows only a case in which the exciter and the reflector are different devices. It should be understood that this embodiment of this application is not limited thereto.

For example, the excitation signal may be based on orthogonal frequency division multiplexing (OFDM) modulation. Alternatively, the excitation signal may be based on discrete Fourier transform spread orthogonal frequency division multiplexing (discrete Fourier transformation-spread-orthogonal frequency division multiplexing, DFT-s-OFDM) modulation, that is, OFDM modulation with discrete Fourier transform (discrete Fourier transformation, DFT) precoding/conversion. Alternatively, the excitation signal may be based on single-carrier quadrature amplitude modulation (SC-QAM) modulation (also referred to as a linear filtering single carrier), or the like.

For example, the excitation signal may alternatively be based on a single carrier symbol block, that is, a plurality of data symbols in time domain form one data block, and a cyclic prefix may be added in front of each data block. In this example, a time unit of the excitation signal may be, for example, a single carrier symbol block.

It should be understood that there may be a plurality of forms of time units of the excitation signal. This is not limited herein. For example, the time unit of the excitation signal may be represented as an OFDM symbol or a single carrier symbol block.

It should be further understood that, as repeatedly mentioned in this embodiment of this application, the OFDM symbol of the excitation signal is used to indicate that a waveform used based on the excitation signal is OFDM or a variation (for example, DFT-s-OFDM) of OFDM. Further, the excitation signal may be in another waveform, such as a linear filtering single carrier. In this case, the linear filtering single carrier is sent and received by using a data block as a unit. Therefore, in this embodiment of this application, OFDM may correspond to a data block in the linear filtering single carrier.

For example, the W excitation signals may be used to represent excitation signals carried in W time units. Alternatively, the W excitation signals may be used to represent excitation signals carried in W time units in the backscatter communication slot.

Figure 5:
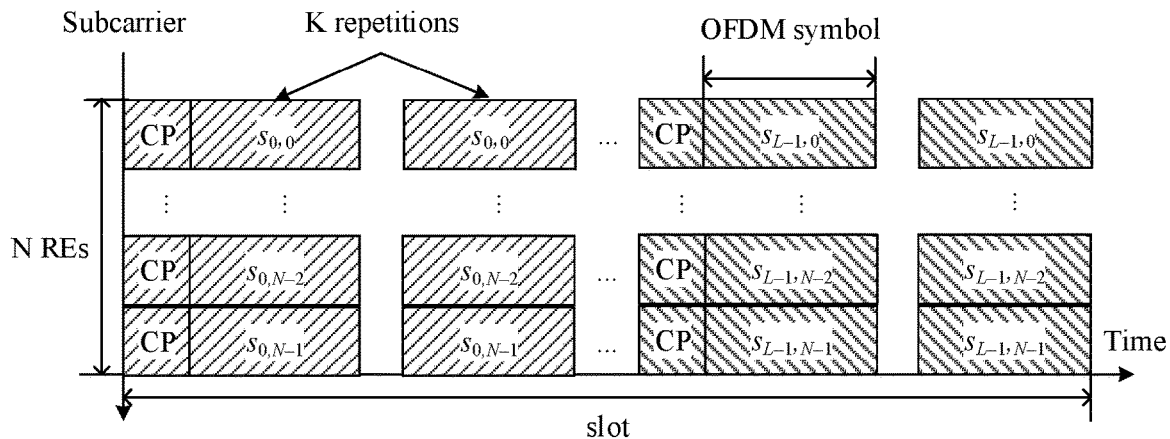
FIG. 5 is a schematic diagram of a time-frequency structure of an excitation signal according to an embodiment of this application.
Figure 6:
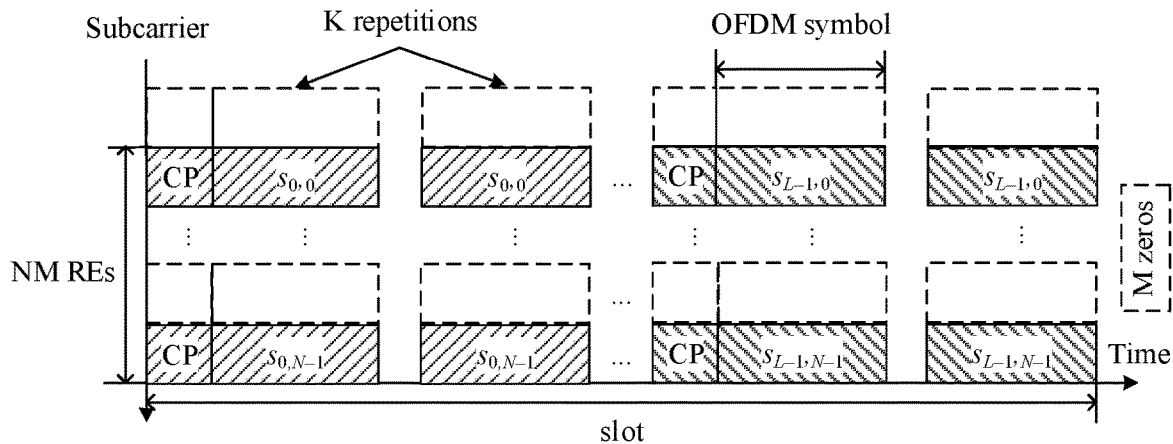
FIG. 6 is another schematic diagram of a time-frequency structure of an excitation signal according to an embodiment of this application.

For example, a time-frequency structure of the excitation signal may be shown in FIG. 5 or FIG. 6. FIG. 5 is a schematic diagram in which there is no interval between frequency domain resources occupied by excitation signals. FIG. 6 is a schematic diagram in which there is an interval between frequency domain resources occupied by excitation signals. The two structures may achieve a similar effect in time domain.

K represents a quantity of repetitions of a same OFDM symbol, for example, K=15. L represents a quantity of OFDM symbols in one backscatter communication slot, and N or NM represents a quantity of REs. M represents a quantity of REs (resource elements) on which no excitation signal is carried. A CP is optional, that is, the CP may exist or not exist.

The RE may also be referred to as a resource element or a subcarrier. In an OFDM-based communication system, for example, in LTE or 5G, one RE may correspond to one time domain symbol in time domain, and may correspond to one subcarrier in frequency domain. In embodiments of this application, a time-frequency resource of the RE may be an example of a resource unit. For example, the time domain symbol may be an orthogonal frequency division multiple access (OFDMA) symbol or a single-carrier frequency division multiple access (SC-FDMA) symbol.

It should be understood that K, L, N, and M may be predefined constants, or may be constants indicated by a receiver, the exciter, another device, or the like. This is not limited herein. Values of K, L, N, and M are not limited either.

Within time of the K repetitions of the OFDM symbol, for example, L data symbols of the reflector may be reflected; one reflected data symbol may be repeatedly reflected within time of a plurality of different sets of K repetitions of the OFDM symbol for excitation signals; or L data symbols of the reflector may be repeatedly reflected within time of P different sets of K repetitions of the OFDM symbol for excitation signals. K, L, and P are integers. For example, K=2, L=2, and P=1. For another example, K=1, P=1, and L=1. For another example, K=2, L=1, and P=1.

For example, when the reflector reflects data, the reflector may multiply a received excitation signal by a data symbol. $s_{i,j}$ indicates a scrambling sequence or a symbol corresponding to a scrambling sequence, and is a symbol carried in a signal sent by the exciter. In a possible implementation, the symbol may be known to the receiver, or the receiver may reproduce the symbol in a preset manner. This is not limited herein.

In the structure shown in FIG. 5, the K repetitions may not be simple duplication, but there is a phase difference between adjacent symbols. For example, a phase $s_{i,j}$ may be expressed as $s_{i,j}=e^{j\Phi}s_{(i+1),j}$, or the phase $s_{i,j}$ may be equivalently written as $s_{(i+1),j}=e^{-j\Phi}s_{i,j}$, where $0\leq i\leq L-2$, $0\leq j\leq N-1$.

$s_{i,j}$ may be preprocessed data, for example, data obtained through discrete Fourier transform (DFT) or a sequence known to a receive end (or a part of the data $s_{i,j}$ known to the receive end). A zero correlation sequence (Zadoff-Chu sequence), a Gold sequence, an m-sequence, or the like may be carried in $s_{i,j}$.

It should be understood that FIG. 5 and FIG. 6 are merely examples, and do not limit the protection scope of embodiments of this application. The time-frequency structure of the excitation signal may further include another form. This is not limited herein.

420: The reflector reflects data and a reference signal.

The reflector may reflect the received excitation signal, and modulate the data and the reference signal of the reflector on the reflected signal.

That is, the reflector reflects the data and L reference signals to the receiver, where the L reference signals are carried in L excitation signals in the W excitation signals, where L is an integer greater than or equal to 1, and L is less than or equal to W. For example, W and L are both integers greater than or equal to 2.

That the L reference signals are carried in L excitation signals in the W excitation signals may indicate that the L reference signals are respectively carried in the L excitation signals. In other words, one reference signal is loaded onto each of the L excitation signals. Alternatively, this may be understood as that excitation signals other than the L excitation signals in the W excitation signals may be used to carry the reflected data.

For example, a time unit is a slot, and in a backscatter communication slot, for example, a quantity of data symbols may be any one of the following: 6, 8, 10, 12, 14, 16, 18, 24, 32, 48, 64, or 80.

It should be understood that loading or carrying is repeatedly mentioned in embodiments of this application. Being loaded or carried in a signal domain, for example, may be embodied as multiplication of two signals.

Optionally, before the reflector reflects the signal, one or more of the following processing may be performed on the data reflected by the reflector: channel coding, scrambling, and modulation.

Figure 7:
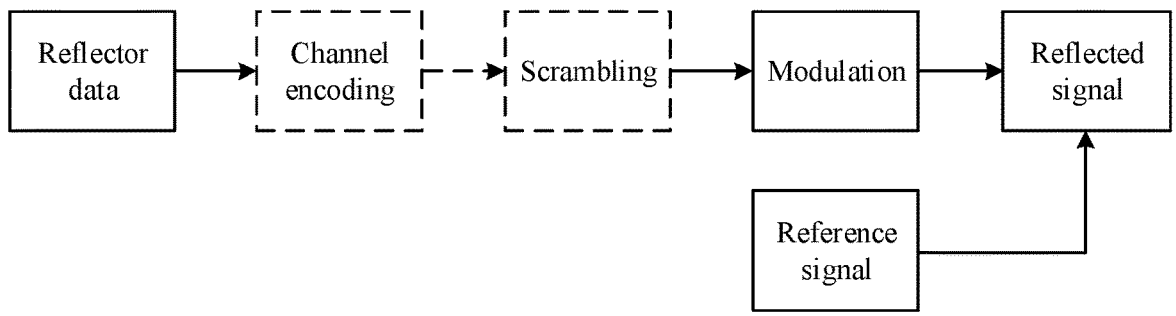
FIG. 7 is a schematic diagram of reflecting a signal by a reflector according to an embodiment of this application.

FIG. 7 is a schematic diagram of reflecting a signal by the reflector. A reflected signal indicates a signal reflected by the reflector, and may include, for example, data and a reference signal of the reflector.

As shown in FIG. 7, after original bit data is modulated, the original bit data is superimposed on the reference signal through time division, space division, or code division, and then is loaded onto a received excitation signal and reflected. Before the data of the reflector is modulated, the method may further include channel coding and scrambling operations. Through channel coding and scrambling, a capability of resisting channel fading and interference can be further improved.

It should be understood that sending of the excitation signal by the exciter and reflection of the data and the reference signal by the reflector may be synchronously performed. That is, when receiving the exciter, the reflector reflects the data and/or the reference signal. Alternatively, the reflector also reflects the data and/or the reference signal when receiving the exciter signal.

The following describes in detail the reference signal and the reflected data.

Optionally, the method 400 may further include step 430.

430: The receiver demodulates the reflected data.

After receiving the reflected signal, the receiver may demodulate the data on the reflected signal and obtain the data of the reflector.

The following describes in detail a manner in which the receiver demodulates the reflected data.

Optionally, the method 400 may further include step 4401 and/or step 4402.

4401: The receiver feeds back a communication result to the reflector.

4402: The receiver feeds back a communication result to the exciter.

That is, after receiving the reflected signal and demodulating the reflected data, the receiver may feed back the communication result to the reflector and/or the exciter.

In a possible manner, the receiver sends a feedback signal to the reflector. For example, this manner is applicable to a case in which the reflector has a strong capability or the receiver is close to the reflector.

In another possible manner, the receiver feeds back the communication result to the exciter. The exciter may perform some operations based on the communication result that is fed back, for example, stopping sending an excitation signal, or querying another reflector. For example, this manner is applicable to a case in which the receiver is far away from the reflector.

In another possible manner, the receiver feeds back the communication result to the exciter, and then the exciter notifies the reflector of the communication result. The reflector may perform some operations based on the communication result that is fed back, for example, determining whether to continue backscatter communication, or determining a parameter for continuing backscatter communication. For example, this manner is applicable to a case in which the receiver is far away from the reflector.

Optionally, before that the reflector reflects the data and L reference signals to the receiver, the method 400 may further include: The reflector receives configuration information, where the configuration information may include one or more of the following information: a format of the reference signal, a location of the reference signal in a time domain resource, a quantity L of the reference signals, a location of an excitation signal that does not carry the reference signal and/or the data in the time domain resource, a quantity of excitation signals that do not carry the reference signal and/or the data, a location of an excitation signal that carries the reference signal in the time domain resource, a quantity of excitation signals that carry the reference signal, and a demodulation scheme of the data.

That is, the receiver, the exciter, or another device may configure a parameter related to backscatter communication, for example, may configure any one or more of the foregoing parameters for the reflector, so that the reflector reflects the data and the reference signal.

The configuration information may include the format of the reference signal, for example, may include a format 1 or a format 2. That is, the reflector may determine, based on the configuration information, whether the format of the reference signal is the format 1 or the format 2. The following describes in detail the format 1 and the format 2.

The configuration information may include the location of the reference signal in the time domain resource. That is, the reflector may determine, based on the configuration information, a location of the time domain resource carrying the reference signal. For example, symbols that carry the reference signal are determined.

The configuration information may include the quantity L of reference signals. For example, the reflector may determine, based on the configuration information, a quantity of symbols of the reference signal in one or more backscatter communication time units. For example, the quantity of symbols of the reference signal may be any one of the following values: 2, 3, 4, or 8.

The configuration information may include the location of the excitation signal that does not carry the reference signal and/or the data in the time domain resource. For example, the reflector may determine, based on the configuration information, a time location at which no reflected signal is carried.

In a possible form, the configuration information may include "reflected" information and "non-reflected information". The "reflected" information includes information related to a reflected reference signal, for example, may include a time location, a time length, and a quantity. The "non-reflected" information includes information related to a non-reflected signal, for example, may include a time location, a time length, and a quantity.

The configuration information may include the quantity of excitation signals that do not carry the reference signal and/or the data. For example, the reflector may determine, based on the configuration information, a time unit in which no signal is reflected in one or more backscatter communication time units.

It should be understood that the foregoing descriptions are merely examples, and embodiments of this application are not limited thereto. For example, the configuration information may further include a quantity F of reflected symbols in the backscatter communication time unit, and F may include L, or may not include L. F is greater than L. A value of F is an integer. For example, F may be any integer from 6 to 80. The value of F is not limited in this embodiment of this application.

The foregoing describes, with reference to FIG. 4, a schematic procedure applicable to embodiments of this application. The following describes in detail the reflected data, the reference signal, and the manner in which the receiver demodulates the reflected data. It should be understood that the reflected data, the reference signal, and the manner in which the receiver demodulates the reflected data that are described below may be used separately or may be used in combination. This is not limited herein.

1. Reflected Data

The following describes the reflected data from two perspectives.

Perspective 1: Time-Frequency Structure of the Reflected Data

Figure 8:
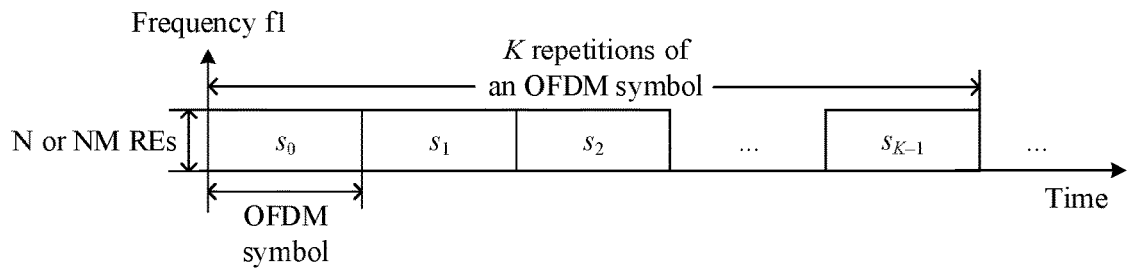
FIG. 8 is a schematic diagram of a time domain structure of an excitation signal according to an embodiment of this application.
Figure 9:
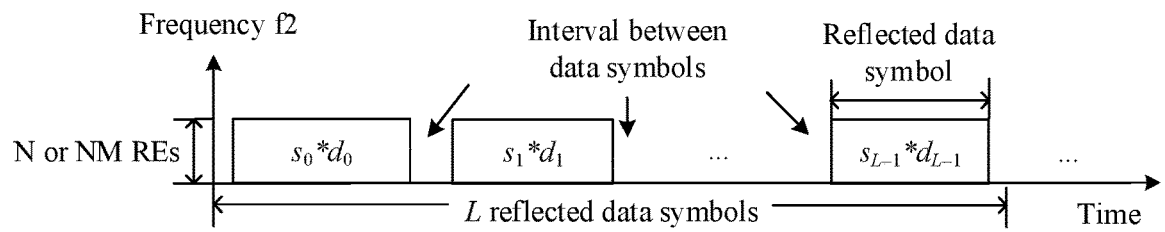
FIG. 9 is a schematic diagram of a time domain structure of reflected data according to an embodiment of this application.

A reflected signal indicates a signal reflected by the reflector, and includes, for example, a reference signal and reflected data. A frequency domain structure of the reflected signal is similar to that of an excitation signal, and bandwidths of the reflected signal and the excitation signal are the same. As shown in FIG. 8 and FIG. 9, frequency location f1 and f2 of the reflected signal and the excitation signal may be different. For example, during reflection, the reflector may perform frequency shift on a received excitation signal.

For example, a time unit of the reflected signal may be the same as that of the excitation signal, or may be a fractional multiple or an integer multiple of a time unit of the excitation signal. This is not limited herein.

A relationship between the reflected signal and the excitation signal in time domain may be, for example, shown in FIG. 8 and FIG. 9. In the figures, $s_0, s_1, s_2, \ldots, s_{K-1}$, and the like represent excitation signals, and $d_0, d_1, \ldots, d_{L-1}$ and the like represent reflected data. $s_i$ may be a vector, or $s_i$ may be a single data bit or symbol. In addition, there may be a phase difference between $s_i$ and $s_j$ at two different time points. For example, $s_{i+1}=s_i*e^{-j\Phi}$. For example, if the excitation signal is a single carrier, $s_i$ or $e^{-j\Phi}$ is a single data bit or a single symbol. For another example, if the excitation signal is a bandwidth signal, $s_i$ and $e^{-j\Phi}$ each may be a data bit or a symbol. L pieces of reflected data may be reflected within time of K repetitions for excitation signals. For example, K=2, and L=2. For another example, K=1, L=1, and P=1. For another example, K=2, and L=1.

When the reflector reflects data, the reflector may multiply (which may also be referred to as loading or carrying) a received excitation signal by a data symbol.

A time interval between data symbols of the reflector is shown in FIG. 9. An interval length may be 0, or may be greater than 0. When the interval is greater than 0, intervals between L data symbols may have an equal length, or may have an unequal length. When the intervals between the L data symbols have an unequal length, a difference between the intervals is less than or equal to a preset value or a predetermined constant.

In this application, a design solution of a time-frequency structure of an excitation signal and a time-frequency structure of a reflected signal is compatible with an existing network, for example, an OFDM system in a cellular network, so that existing mature terminal and base station technologies in 4G and 5G can be effectively used, thereby reducing costs and thresholds of the exciter and the receiver. In addition, it is convenient to implement frequency division multiplexing and achieve good out-of-band and demodulation performance.

Perspective 2: Modulation Scheme of the Reflected Data

Optionally, the reflected data may be modulated in at least any one of the following schemes.

Modulation Scheme 1: Data Modulation Symbol ($2^M$-PSK, $2^M$-QAM, or $2^M$-ASK)

Figure 10:
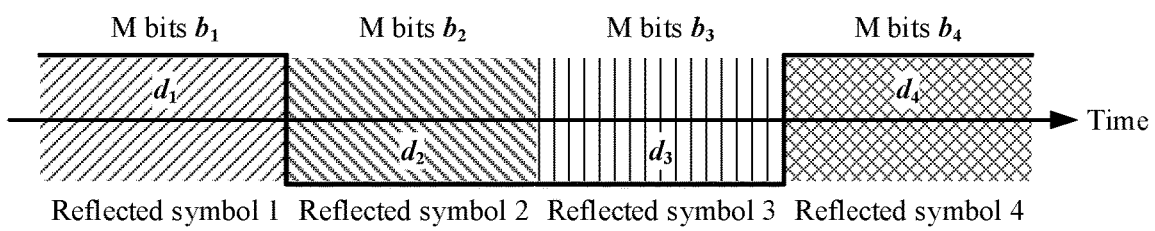
FIG. 10 to FIG. 14 are schematic diagrams of modulation schemes of reflected data according to an embodiment of this application.

FIG. 10 is a schematic diagram of the modulation scheme 1. That is, a single reflected symbol, such as a reflected symbol 1, a reflected symbol 2, a reflected symbol 3, or a reflected symbol 4, is loaded with a common data modulation symbol, such as phase shift keying (PSK), quadrature amplitude modulation (QAM), or ASK.

Modulation Scheme 2: Positive/Negative Reflection of a Modulation Symbol ($2^M$-PSK, $2^M$-QAM, or $2^M$-ASK) or Reflection Indication (that is, a High Level and a Low Level are Reflected Successively, or a Low Level and a High Level are Reflected Successively Within Time of a Bit/Symbol, to Represent Different Bits/Symbols)

Figure 11:
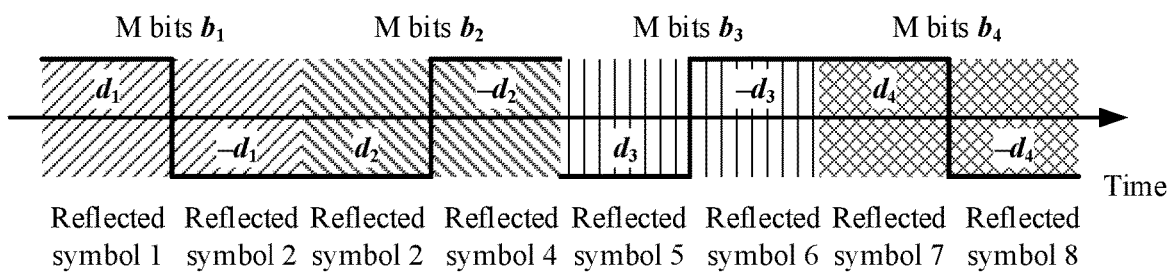

FIG. 11 is a schematic diagram of the modulation scheme 2. A same modulation symbol may be loaded onto a plurality of reflected symbols.

FIG. 11 shows positive/negative reflection of the modulated symbol.

Modulation Scheme 3: Modified Miller Modulation Scheme

Figure 12:
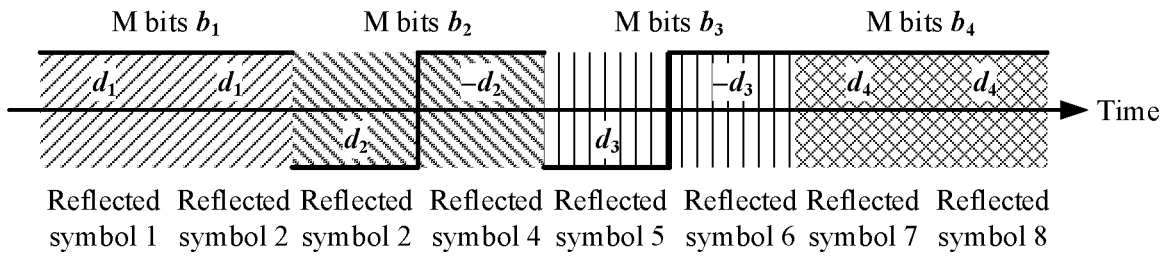

FIG. 12 is a schematic diagram of the modulation scheme 3. A same modulation symbol may be loaded onto a plurality of reflected symbols.

The modulation scheme may include, for example, pi/2-binary phase shift keying (BPSK), ASK, and binary on-off keying (OOK).

Modulation Scheme 4: Offset Modulation

Figure 13:
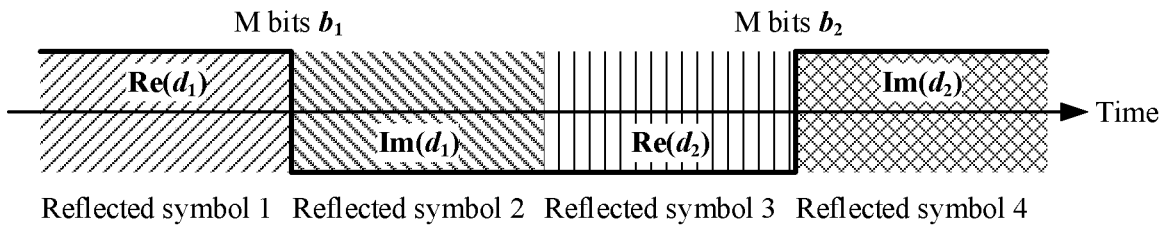

FIG. 13 is a schematic diagram of the modulation scheme 4. A same modulation symbol may be loaded onto a plurality of reflected symbols.

Modulation Scheme 5: Offset Phase Modulation ($e^{j\Phi}-2^M$-PSK, $e^{j\Phi}-2^M$-QAM, or $e^{j\Phi}-2^M$-ASK)

Figure 14:
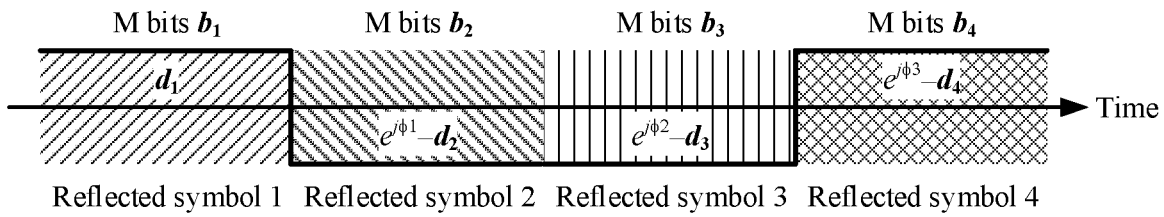

FIG. 14 is a schematic diagram of the modulation scheme 5. For data symbols between a plurality of reflected symbols, phase and constellation diagram may be shifted based on a predefined pattern.

It should be understood that the foregoing several modulation schemes are merely examples for description. For a specific implementation, refer to an existing operation. This is not limited herein. Any manner in which the reflected symbol can be modulated falls within the protection scope of embodiments of this application.

2. Reference Signal

The following describes the reference signal from two perspectives.

Perspective 1: Format of the Reference Signal

Format 1: All Reference Signals of the Reflector Need to be Sent.

A reflected signal is carried by reflecting an excitation signal. When the data is reflected, the reflected data may be loaded onto (or multiplied by or carried on) the excitation signal received by the reflector for reflection. The reference signal may also be loaded onto (or multiplied by or carried on) the excitation signal received by the reflector for reflection. A backscatter communication time unit (for example, any one of a slot, a subframe, or a frame) may carry the L reference signals. When the format of the reference signal is the format 1, the L reference signals are all loaded onto excitation signals.

In other words, for the L reference signals, the L excitation signals in the W excitation signals are used to carry the L reference signals, and the remaining W−L excitation signals may be used to carry the data. L is greater than or equal to 2, and L is less than W.

Optionally, the L reference signals are carried in L time units, and each time unit carries one reference signal; and two reference signal symbols carried in two adjacent time units are opposite.

Two adjacent reference signals are opposite numbers to each other, that is, symbols are opposite. Such a design in which adjacent symbols are opposite can make channel estimation corresponding to the reflected data more accurate (that is, a signal-to-noise ratio is higher).

Figure 15:
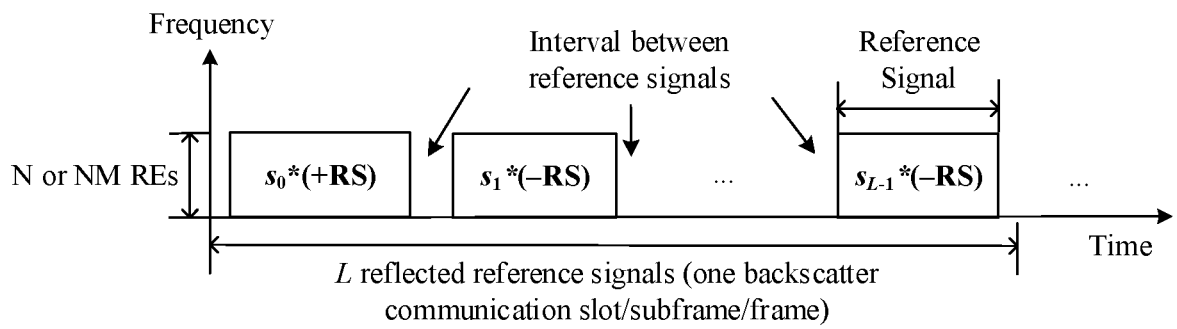
FIG. 15 is a schematic diagram of a reference signal according to an embodiment of this application.
Figure 16:
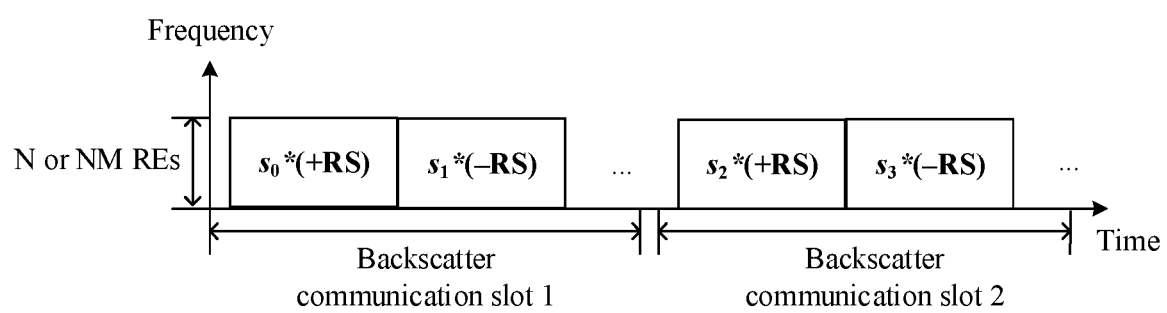
FIG. 16 is another schematic diagram of a reference signal according to an embodiment of this application.

FIG. 15 and FIG. 16 are schematic diagrams of the format 1 of the reference signal according to embodiments of this application.

In the figures, $s_0$, $s_1$, $s_2$, $s_3$, and the like represent excitation signals, and RS represents a reference signal. It can be learned that adjacent reference signal symbols are opposite.

When the format of the reference signal is the format 1, a difference between two reflected symbols can be supported, to eliminate an excitation signal.

Format 2: No Signal is Reflected on Some Excitation Signals.

In other words, the W excitation signals include T excitation signals, and the T excitation signals do not carry the reference signal and/or the reflected data, where T is an integer greater than 0. Alternatively, this may be understood as that in L+T reference signals, the L excitation signals are used to carry the L reference signals, and the T reference signals are not sent. Alternatively, this may be understood as that all L+T excitation signals are used to carry reference signals, the reflector reflects the reference signals by using the L excitation signals, and no signal is reflected on the T excitation signals.

Optionally, T is greater than L.
Optionally, T is less than L.
Optionally, T is equal to L.
Optionally, when T is equal to L, locations of the reference signals and the excitation signals in the T excitation signals in a time unit may alternately appear.

For example, the T excitation signals carry neither the reference signal nor the data, that is, no signal is reflected on the T excitation signals. Alternatively, only a low-power auxiliary signal is reflected on the T excitation signals (compared with another symbol location at which a reference signal is reflected).

A time unit in which the T excitation signals are located may be used to estimate a channel between the exciter and the receiver. That is, in this case, there is no reflected signal in a received signal, or there is only a low-power reflected signal in a received signal. In this way, the receiver is supported to cancel the excitation signal on other received signals having a reflected reference signal and/or a reflected data signal by using the estimated channel between the exciter and the receiver, and then obtain the data of the reflector. In addition, when the format of the reference signal is the format 2, differential demodulation may also be supported.

Figure 17:
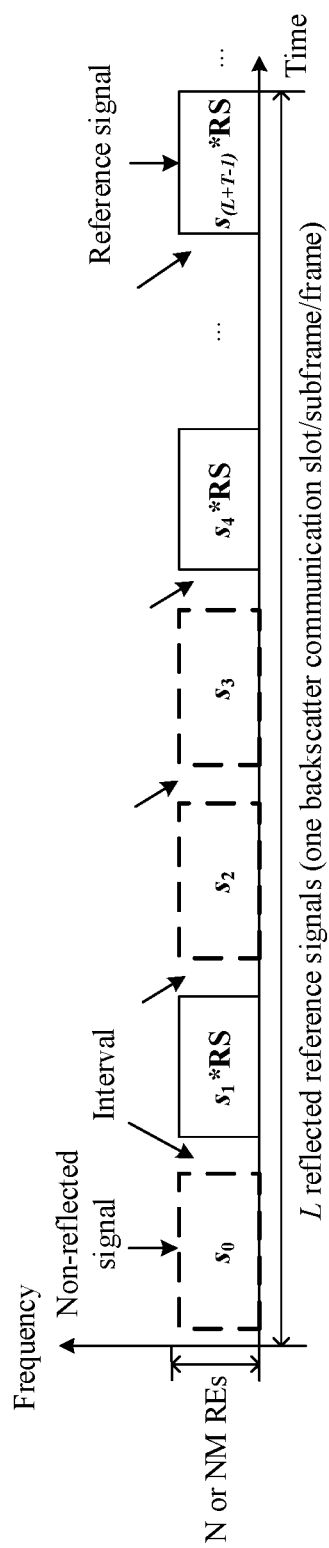
FIG. 17 is a schematic diagram of another reference signal according to an embodiment of this application.
Figure 18:
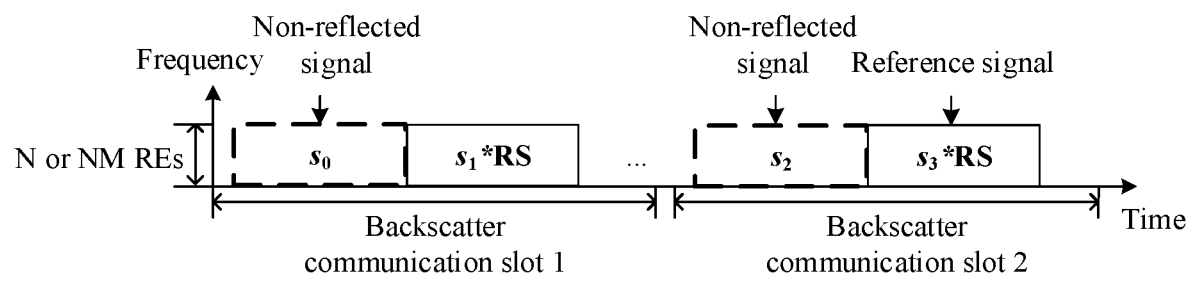
FIG. 18 is another schematic diagram of another reference signal according to an embodiment of this application.
Figure 19:
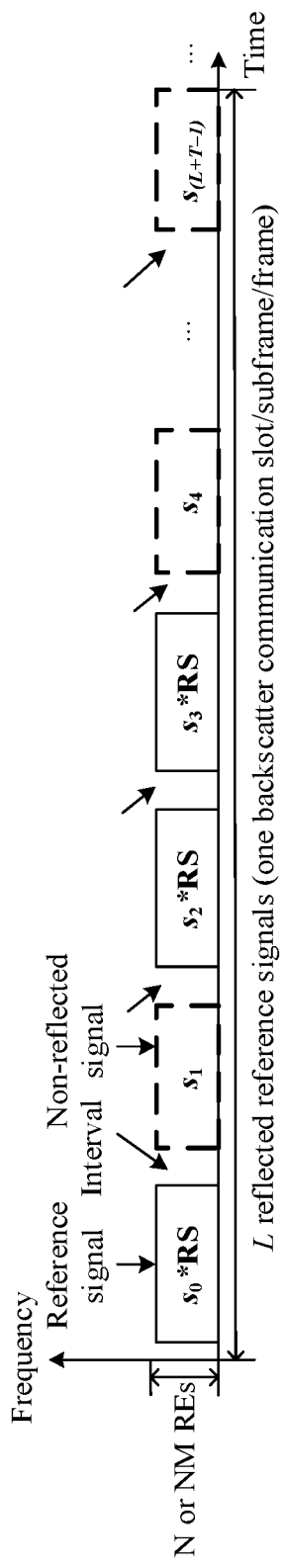
FIG. 19 is another schematic diagram of still another reference signal according to an embodiment of this application.

FIG. 17 to FIG. 19 are schematic diagrams of the format 2 of the reference signal according to embodiments of this application.

In the figures, $s_0$, $s_1$, $s_2$, $s_3$, and the like represent excitation signals, and RS represents a reference signal. It can be seen that no signal is reflected on some excitation signals. For ease of clarity, a dashed-line box in the figures indicates that no signal is reflected, or only a low-power auxiliary signal is reflected (compared with another marked symbol location at which a reference signal is reflected).

Optionally, when the format of the reference signal is the format 2, in a backscatter communication time unit (a slot, a subframe, or a frame), there may be a plurality of symbols marked with "non-reflected signals" and other symbols marked with "reflected signals" in the figures, and quantities of the symbols are respectively T and L.

Optionally, when the format of the reference signal is the format 2, reference signal type ("non-reflected" and "reflected") information, time lengths (or quantities) of various reference signal types, time location information of various reference signal types, and the like may be further configured.

The term "non-reflected" indicates that the reference signal and the data signal are not reflected, and the term "reflected" indicates that the reference signal is reflected.

In embodiments of this application, the "non-reflected" signal is used to indicate that no signal is reflected on the excitation signal, or no information is reflected at the time location, or only a low-power auxiliary signal is reflected.

In a possible case, a time interval at which "non-reflected" signals appear may be shorter than a time interval at which reference signals appear.

That is, the "non-reflected" signals appear more closely in terms of time (for example, a backscatter communication slot, a backscatter communication subframe, or a backscatter communication frame). For example, an interval between "non-reflected" signals that are adjacent in terms of time is less than an interval between reference signals that are adjacent in terms of time.

As shown in FIG. 17, $s_0$, $s_2$, $s_5$, and the like are all "non-reflected" signals, and an interval between the signals is less than an interval between "reflected" reference signals.

In this case, the excitation signal can be estimated more accurately, thereby reducing interference caused by a residual excitation signal.

In another possible case, a time interval at which "non-reflected" signals appear may be longer than a time interval at which reference signals appear.

That is, the "non-reflected" signals appear more sparsely in terms of time (for example, a backscatter communication slot, a backscatter communication subframe, or a backscatter communication frame). For example, an interval between "non-reflected" signals that are adjacent in terms of time is greater than an interval between reference signals that are adjacent in terms of time.

As shown in FIG. 19, $s_0$, $s_2$, $s_3$, and the like all reflected reference signals, and an interval between the reference signals is less than an interval between "non-reflected" signals.

In this case, a channel through which the reflected data passes can be estimated more accurately, thereby improving detection performance. It should be understood that in these embodiments, the reflector reflects the data signal at other time of the reflected or non-reflected reference signal.

It should be understood that the foregoing two cases are merely examples for description, and embodiments of this application are not limited thereto. For example, the time interval at which the "non-reflected" signals appear may be the same as the time interval at which the reference signals appear.

In addition, optionally, locations of the T excitation signals in a time domain resource are before locations of the L excitation signals in the time domain resource; or locations of the T excitation signals in a time domain resource are after locations of the L excitation signals in the time domain resource. This may be understood as that time at which the "non-reflected" signal first appears is earlier than time at which the reference signal first appears. Alternatively, time at which the "non-reflected" signal first appears is later than time at which the reference signal first appears. Alternatively, this may be understood as that time at which all or some "non-reflected" signals appear is earlier than time at which all or some reference signals appear. Alternatively, time at which all or some "non-reflected" signals appear is later than time at which all or some reference signals appear.

When the format of the reference signal is the format 2, the channel between the exciter and the receiver may be estimated by using a time unit in which a non-reflected signal is located, to support the receiver to eliminate the excitation signal, and then obtain the data of the reflector. In addition, when the format of the reference signal is the format 2, differential demodulation may also be supported.

The foregoing describes two possible formats of the reference signal, and the following describes several possible placement manners of the reference signal.

Perspective 2: Placement Manner of the Reference Signal

Optionally, the format of the reference signal may be either of the foregoing formats.

Optionally, in embodiments of this application, a time unit of the reference signal may be the same as that of the excitation signal, or may be a fractional multiple or an integer multiple of a time unit of the excitation signal. This is not limited herein.

Optionally, the placement manner of the reference signal may include at least the following several possible manners.

The following describes distribution of L symbols in time, that is, a placement manner of the L reference signals in a time domain resource.

Placement Manner 1: Interval Placement

An interval between reference signals may be denoted as an interval (gap).

For example, as shown in FIG. 15, there is an interval between two reference signals whose time locations are adjacent. For example, there is an interval between time units in which $s_0$ and $s_1$ are located. For example, an interval between every four symbols is 12 symbols or 24 symbols.

For another example, as shown in FIG. 17, there is an interval between a time unit in which a reflected reference signal is located and a time unit in which a non-reflected signal is located. For example, there is an interval between time units in which $s_0$ and $s_1$ are located.

The interval placement manner is similar to an existing LTE reference signal placement manner, to provide better compatibility.

Placement Manner 2: Consecutive Placement

In other words, the L time units in which the L reference signals are located are consecutive.

For L backscatter communication reference signals in a backscatter communication time unit (for example, any one of a slot, a subframe, or a frame), the L reference signals may be placed consecutively in terms of time. For example, the time unit is a slot, and 12 symbols may be carried in one backscatter communication slot. Assuming that L=2, the two reference signal symbols may be respectively located on the third symbol and the fourth symbol. For another example, the time unit is a slot, and 12 symbols may be carried in one backscatter communication slot. Assuming that L=2, the two reference signal symbols may be respectively located on the sixth symbol and the seventh symbol. For another example, the time unit is a slot, and 12 symbols may be carried in one backscatter communication slot. Assuming that L=2, the two reference signal symbols may be respectively located on the first symbol and the second symbol.

For example, as shown in FIG. 16, in the backscatter communication slot, two reference signals whose time locations are adjacent are consecutive. For example, in a backscatter communication slot 1, time units in which $s_0$ and $s_1$ are located are consecutive. For another example, in a backscatter communication slot 2, time units in which $s_2$ and $s_3$ are located are consecutive.

For another example, as shown in FIG. 18, a time unit in which a reflected reference signal is located and a time unit in which a non-reflected signal is located are consecutive. For example, in a backscatter communication slot 1, time units in which $s_0$ and $s_1$ are located are consecutive. For another example, in a backscatter communication slot 2, time units in which $s_2$ and $s_3$ are located are consecutive.

The consecutive placement manner is similar to a placement manner of reference signals in NR. In addition, in the consecutive placement manner, because a time interval between time locations of reference signals is shorter, the reference signals are less affected by a time-varying characteristic of a channel. Therefore, this helps eliminate the excitation signal when the data of the reflector is recovered.

Placement Method 3: Even Placement

In other words, intervals between the L time units in which the L reference signals are located are the same. The interval may be 0, that is, the time units are consecutive; or the interval may be greater than 0.

For the L reference signals in one backscatter communication time unit (for example, any one of a slot, a subframe, or a frame), the L reference signals may be placed at intervals in terms of time, and the intervals are even in the backscatter communication time unit.

For example, the time unit is a slot, and 12 symbols may be carried in one backscatter communication slot. Assuming that L=2, the two reference signal symbols may be respectively located on the third symbol and the ninth symbol.

Placement Manner 4: Uneven Placement

In other words, intervals between the L time units in which the L reference signals are located are different.

The L reference signals are placed at uneven intervals in one backscatter communication time unit in terms of time. For example, the time unit is a slot, and 12 symbols may be carried in one backscatter communication slot. Assuming that L=3, the three reference signals may be respectively located on the third symbol, the fourth symbol, and the ninth symbol.

It should be understood that the examples listed in the foregoing placement manners are merely examples for description, and do not limit the protection scope of embodiments of this application.

It should be further understood that the foregoing listed several placement manners are merely examples for description, and embodiments of this application are not limited thereto.

The foregoing describes in detail the reflected data and the reference signal. The following describes a demodulation scheme of the reflected data.

3. Demodulation of the Reflected Data

Figure 20:
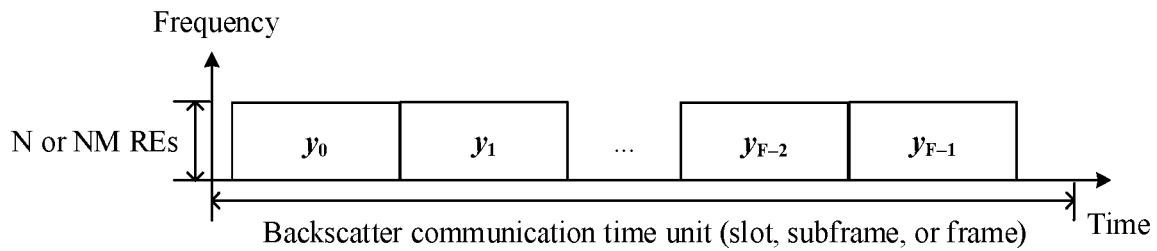
FIG. 20 is a schematic diagram of a time domain structure of a signal received by a receiver according to an embodiment of this application.

In a backscatter communication system, a time-frequency format of a signal obtained by the receiver may be shown in FIG. 20. As shown in the figure, $y_0$, $y_1$, $y_{F-2}$, and $y_{F-1}$ indicate signals received in different time units.

For example, in a system in which the exciter, the receiver, and the reflector each are a single antenna, a signal model may be expressed as Formula 1:

$$y_i = f * b_i * g * s_i + h * s_i + n_i \qquad \text{Formula 1}$$

$s_i$ indicates excitation data, and i indicates a time index. $b_i$ indicates reflector data. * indicates a convolution. f indicates a channel from the reflector to the receiver. g indicates a channel from the exciter to the reflector. h indicates a channel from the exciter to the receiver. $n_i$ indicates noise.

The receiver may recover the reflected data by using at least either of the following solutions.

Solution 1: The Excitation Data is Conjugated First, and Then the Excitation Signal is Eliminated.

In this solution, the channel between the exciter and the receiver needs to be estimated.

Figure 21:
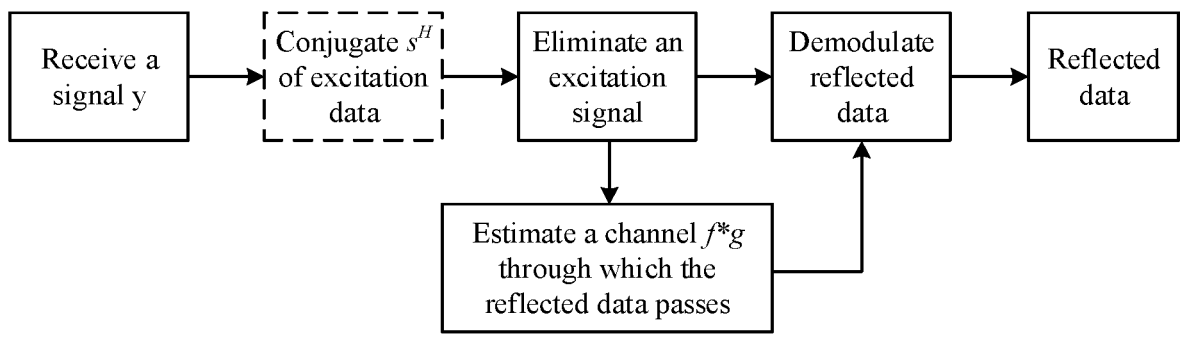
FIG. 21 is a schematic diagram of demodulating data by a receiver according to an embodiment of this application.

FIG. 21 is a schematic diagram of the solution 1. For ease of description, a symbol index i is not marked in the figure.

As shown in FIG. 21, after a signal y is received, conjugate multiplication may be performed on the received signal and excitation data, to obtain Formula 2. For example, if the signal y is a vector, an inner product is obtained.

$$y_i s_i^H = f^* b_i^* g + h + n_i s_i^H \qquad \text{Formula 2}$$

A superscript H indicates a conjugate transpose. For example, $A^H$ indicates a conjugate transpose of a matrix (or a vector) A.

Further, excitation signal cancelation is performed. For example, two different time indexes i and j are differentiated, as shown in Formula 3:

$$y_i s_i^H - y_j s_j^H = f^* g^* (b_i - b_j) + n_i s_i^H - n_j s_j^H \qquad \text{Formula 3}$$

For example, when the format of the reference signal is the format 1, $b_i = -b_j$. For another example, when the format of the reference signal is the format 2, one of $b_i$ and $-b_j$ is 0. Good performance can be achieved when the channel (that is, f*g) between the exciter and the receiver is estimated. Similarly, when the data signal uses any one of the modulation scheme 1 to the modulation scheme 5, the signal $(b_i - b_j)$ may also be demodulated.

After the excitation signal is eliminated, Formula 4 may be obtained:

$$y_i - h^* s_i = f^* b_i^* g^* s_i + n_i \qquad \text{Formula 4}$$

Then, conjugate multiplication is performed on the excitation-eliminated signal and the excitation data, as shown in Formula 5:

$$(y_i - h^* s_i) s_i^H = f^* g^* b_i + n_i s_i^H \qquad \text{Formula 5}$$

Finally, the channel (that is, f*g) between the exciter and the receiver is estimated, and the reflected data $b_i$ is demodulated.

It should be understood that, after the channel f*g is obtained, a manner of detecting $b_i$ or $(b_i - b_j)$ from a signal with noise is not limited. For example, refer to an existing manner.

Solution 2: The Excitation Signal is First Eliminated, and Then the Excitation Data is Conjugated.

Figure 22:
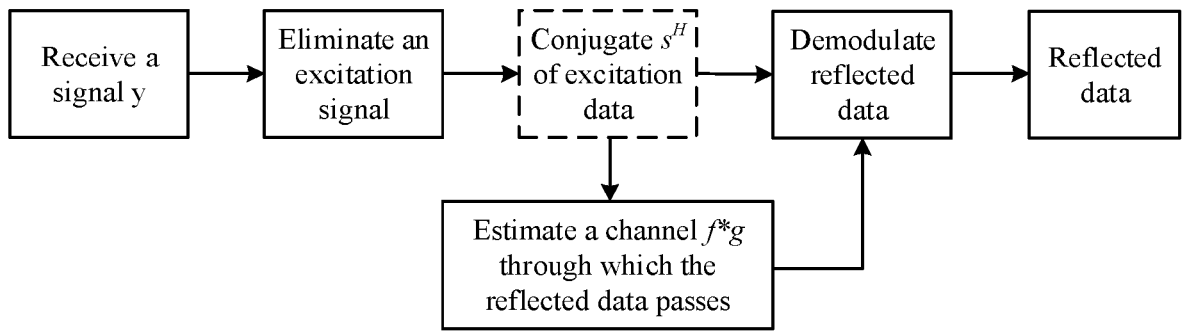
FIG. 22 is another schematic diagram of demodulating data by a receiver according to an embodiment of this application.

FIG. 22 is a schematic diagram of the solution 2. The solution 2 is similar to the solution 1, but sequences in which the excitation signal is eliminated and the excitation data is conjugated are different. Details are not described herein.

It should be understood that, regardless of the solution 1 or the solution 2, conjugation of the excitation data is an optional operation. For example, if $h^* s_i$ can be estimated or eliminated, conjugate multiplication of the excitation data may not need to be performed separately. For example, when the format of the reference signal is the format 2, estimation of $h^* s_i$ can be well supported. In this case, $f^* g^* s_i$ may be estimated as a whole and the reflected data is demodulated.

In this application, the reference signal is designed in backscatter communication, that is, when reflecting data, the reflector reflects the reference signal, so that channel estimation performance of a receive end can be effectively improved, and a gain can be improved.

In addition, a design of the reference signal, for example, the format 1 or the format 2 described above, helps assist in coherent demodulation of the reflected data, and implement elimination of the excitation signal, thereby facilitating data demodulation at a receive end.

In addition, based on the manner of data demodulation by the receive end that is provided in this application, interference caused by the excitation signal to the reflected data signal can be greatly reduced, and demodulation performance can be improved.

Embodiments described in this specification may be independent solutions, or may be combined based on internal logic. These solutions all fall within the protection scope of this application.

It may be understood that in the foregoing method embodiments, the method and the operation that are implemented by the device may also be implemented by a component (for example, a chip or a circuit) that can be used in the device. For example, a method and an operation implemented by the reflector may also be implemented by a component (for example, a chip or a circuit) that can be used in the reflector. For another example, a method and an operation implemented by the receiver may also be implemented by a component (for example, a chip or a circuit) that can be used in the receiver. For another example, a method and an operation implemented by the exciter may also be implemented by a component (for example, a chip or a circuit) that can be used in the exciter.

The foregoing describes in detail the methods provided in embodiments of this application with reference to FIG. 7 to FIG. 22. The following describes in detail apparatuses provided in embodiments of this application with reference to FIG. 23 to FIG. 27. It should be understood that descriptions of the apparatus embodiments correspond to the descriptions of the method embodiments. Therefore, for content that is not described in detail, refer to the foregoing method embodiments. For brevity, details are not described herein again.

In embodiments of this application, functional modules of the transmit end device or the receive end device may be divided based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that module division in embodiments of this application is an example and is merely logical function division. During actual implementation, there may be another division manner. Descriptions are provided below by using an example in which functional modules are divided based on functions.

Figure 23:
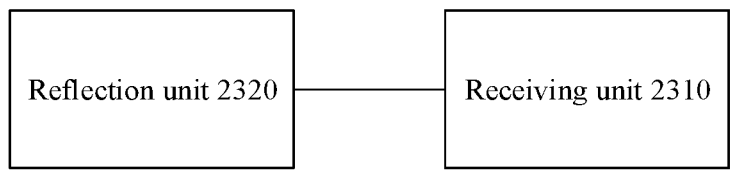
FIG. 23 is a schematic block diagram of a signal transmission apparatus according to an embodiment of this application.

FIG. 23 is a schematic block diagram of a signal transmission apparatus according to an embodiment of this application. As shown in the figure, the apparatus 2300 may include a receiving unit 2310 and a reflection unit 2320.

In a possible design, the apparatus 2300 may implement a corresponding step or procedure performed by the reflector in the foregoing method embodiments. For example, the apparatus 2300 may be a reflector, or a chip, a chip system, or a circuit disposed in the reflector. In this case, the apparatus 2300 may be referred to as a reflector. The receiving unit 2310 is configured to perform receiving-related operations on the reflector side in the foregoing method embodiments, and the reflection unit 2320 is configured to perform reflection-related operations on the reflector in the foregoing method embodiments. For example, the receiving unit and the reflection unit may be implemented by using one circuit, or each may be implemented by using one circuit. This is not limited herein.

In a possible implementation, the receiving unit 2310 is configured to receive W excitation signals. The reflection unit 2320 is configured to reflect data and L reference signals to a receiver, where the L reference signals are respectively carried in L excitation signals in the W excitation signals, where W and L are both integers greater than or equal to 1, and L is less than or equal to W.

Optionally, the W excitation signals include T excitation signals, and the T excitation signals do not carry the reference signal and/or the data, where T is an integer greater than 0.

In another possible implementation, the receiving unit 2310 is configured to receive W excitation signals in a backscatter communication slot. The reflection unit 2320 is configured to reflect, to a receiver, at least two of the following: L reference signals, T excitation signals, and data, where the L reference signals are carried in L excitation signals in the W excitation signals, the T excitation signals belong to the W excitation signals, and the T excitation signals do not carry the reference signal and/or the data, where W and L are both integers greater than or equal to 1, and L is less than or equal to W.

Optionally, W and L are integers greater than or equal to 2.

Optionally, T and L meet any one of the following: T is greater than L, T is equal to L, or T is less than L.

Optionally, when T is equal to L, locations of the reference signals and the excitation signals in the T excitation signals in a time domain resource alternately appear.

Optionally, locations of the T excitation signals in a time domain resource are before locations of the L excitation signals in the time domain resource; or locations of the T excitation signals in a time domain resource are after locations of the L excitation signals in the time domain resource.

Optionally, an interval between the locations of the T excitation signals in the time domain resource is less than an interval between the locations of the L excitation signals in the time domain resource; or an interval between the locations of the T excitation signals in the time domain resource is greater than an interval between the locations of the L excitation signals in the time domain resource.

Optionally, the L reference signals are carried in L time domain units, and each time domain unit carries one reference signal; and two reference signal symbols carried in two adjacent time domain units are opposite.

Optionally, the L time domain units meet any one of the following: intervals between the L time domain units are the same; intervals between the L time domain units are different; or the L time domain units are consecutive.

Optionally, the receiving unit 2310 is further configured to receive configuration information, where the configuration information includes one or more of the following information: a format of the reference signal, the location of the reference signal in the time domain resource, a quantity L of the reference signals, a location of an excitation signal that does not carry the reference signal and/or the data in the time domain resource, a quantity of excitation signals that do not carry the reference signal and/or the data, a location of an excitation signal that carries the reference signal in the time domain resource, a quantity of excitation signals that carry the reference signal, and a demodulation scheme of the data.

Optionally, each excitation signal carries one reference signal.

Optionally, the reference signal is used by the receiver to cancel the excitation signal and/or demodulate data of the reflector.

Optionally, the receiving unit 2310 is specifically configured to receive the W excitation signals in a backscatter communication slot.

The apparatus 2300 may implement a corresponding step or procedure performed by the reflector in FIG. 4 to FIG. 22 according to embodiments of this application, and the apparatus 2300 may include units configured to perform the methods performed by the reflector in FIG. 4 to FIG. 22. In addition, the units in the apparatus 2300 and the foregoing other operations and/or functions are separately used to implement corresponding procedures of the reflector in FIG. 4 to FIG. 22.

It should be understood that, a specific process in which each unit performs the foregoing corresponding step has been described in detail in the foregoing method embodiments. For brevity, details are not described herein again.

Figure 24:
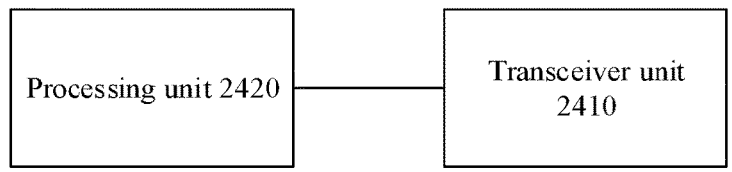
FIG. 24 is a schematic block diagram of another signal transmission apparatus according to an embodiment of this application.

FIG. 24 is a schematic block diagram of another signal transmission apparatus according to an embodiment of this application. As shown in the figure, the apparatus 2400 may include a transceiver unit 2410 and a processing unit 2420. For example, the transceiver unit and the processing unit may be implemented by using one circuit, or each may be implemented by using one circuit. This is not limited herein.

In a possible design, the apparatus 2400 may implement a corresponding step or procedure performed by the receiver in the foregoing method embodiments. For example, the apparatus 2400 may be a receiver, or a chip, a chip system, or a circuit disposed in the receiver. In this case, the apparatus 2400 may be referred to as a receiver.

In a possible implementation, the transceiver unit 2410 is configured to receive a plurality of signals, where each signal includes data and L reference signals, and the L reference signals are carried in L excitation signals. The processing unit 2420 is configured to demodulate the plurality of signals.

Optionally, the plurality of signals include a first signal and a second signal, and time domain units carrying the first signal and the second signal are adjacent. The processing unit 2420 is specifically configured to perform subtraction processing on the first signal and the second signal.

The apparatus 2400 may implement a corresponding step or procedure performed by the receiver in FIG. 4 to FIG. 22 according to embodiments of this application. The apparatus 2400 may include units configured to perform the methods performed by the receiver in FIG. 4 to FIG. 22. In addition, the units in the apparatus 2400 and the foregoing other operations and/or functions are separately used to implement corresponding procedures of the receiver in FIG. 4 to FIG. 22.

It should be understood that, a specific process in which each unit performs the foregoing corresponding step has been described in detail in the foregoing method embodiments. For brevity, details are not described herein again.

Figure 25:
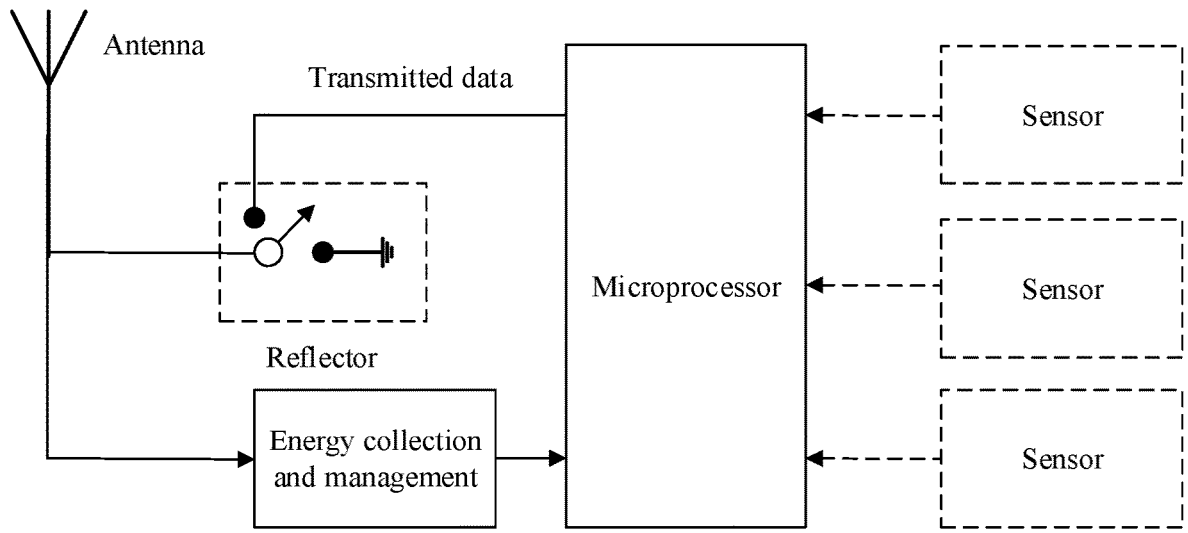
FIG. 25 is a schematic diagram of a reflector according to an embodiment of this application.

FIG. 25 is a schematic diagram of a reflector according to an embodiment of this application.

When energy is received, an internal circuit of the reflector may be connected to a charging module; and when a signal is reflected, the internal circuit of the reflector may be connected to a reflection and modulation module. A sensor is optional. A microprocessor in the reflector mainly processes received data and reflected data.

It should be understood that FIG. 25 is merely an example for description. The reflector may alternatively be a terminal device or a network device.

Figure 26:
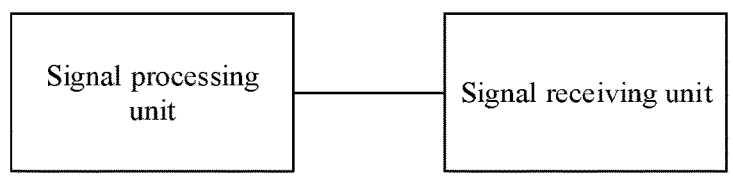
FIG. 26 is a schematic diagram of a receiver according to an embodiment of this application.

FIG. 26 is a schematic diagram of a receiver according to an embodiment of this application. As shown in FIG. 26, the receiver may include a signal receiving unit and a signal processing unit. The signal processing unit of the receiver may be configured to process a received signal. For example, the signal receiving unit and the signal processing unit may be implemented by using one circuit, or each may be implemented by using one circuit. This is not limited herein.

It should be understood that FIG. 26 is merely an example for description. The receiver may alternatively be a terminal device or a network device.

Figure 27:
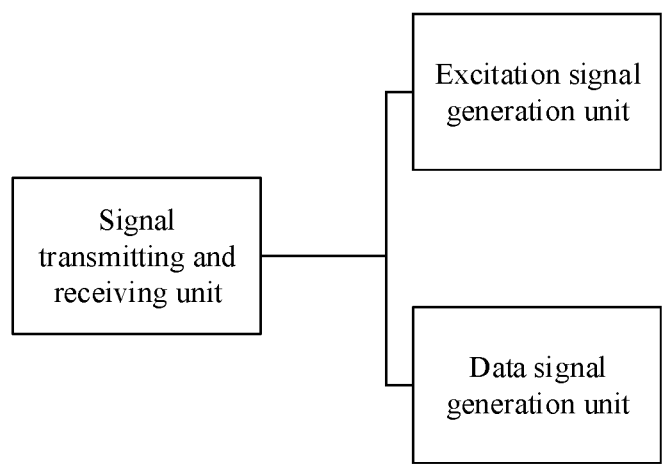
FIG. 27 is a schematic diagram of an exciter according to an embodiment of this application.

FIG. 27 is a schematic diagram of an exciter according to an embodiment of this application. As shown in FIG. 27, the exciter may include an excitation signal generation unit, a data signal generation unit, and a signal transmitting and receiving unit. For example, the excitation signal generation unit, the data signal generation unit, and the signal transmitting and receiving unit may be implemented by using one circuit, or each may be implemented by using one circuit. This is not limited herein.

In the exciter, the signal transmitting and receiving unit may be configured to transmit and receive a signal. The excitation signal generation unit may be configured to generate a to-be-transmitted excitation signal. The data signal generation unit may be configured to generate a to-be-transmitted data signal.

It should be understood that FIG. 27 is merely an example for description. The exciter may alternatively be a terminal device or a network device.

An embodiment of this application further provides a processing apparatus, including a processor and an interface. The processor may be configured to perform the method in the foregoing method embodiments.

It should be understood that, the processing apparatus may be a chip. For example, the processing apparatus may be a field programmable gate array (FPGA), an application-specific integrated chip (application-specific integrated circuit, ASIC), a system on chip (SoC), a central processing unit (CPU), a network processor (NP), a digital signal processing circuit (DSP), a micro controller unit (MCU), a programmable controller (programmable logic device, PLD), or another integrated chip.

In an implementation process, each step of the foregoing methods may be completed by using an integrated logic circuit of hardware in the processor or instructions in a form of software. The steps of the methods disclosed with reference to embodiments of this application may be directly presented as being performed and completed by a hardware processor, or performed and completed by a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in embodiments of this application may be an integrated circuit chip and has a signal processing capability. In an implementation process, each step of the foregoing method embodiments may be completed by using an integrated logic circuit of hardware in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams that are disclosed in embodiments of this application may be implemented or performed. The general-purpose processor may be a microprocessor, or the processor may alternatively be any conventional processor, or the like. The steps of the methods disclosed with reference to embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that, in embodiments of this application, the memory may be a transitory memory or a non-transitory memory, or may include both a transitory memory and a non-transitory memory. The non-transitory memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus dynamic random access memory (direct Rambus RAM, DR RAM). It should be noted that the memory in the system and the method described in this specification includes but is not limited to the memories and memories of any other appropriate types.

According to the method provided in embodiments of this application, this application further provides a computer program product. The computer program product includes computer program code. When the computer program code is run on a computer, the computer is enabled to perform the method in any one of the embodiments shown in FIG. 4 to FIG. 22.

According to the method provided in the embodiments of this application, this application further provides a computer-readable medium. The computer-readable medium stores program code. When the program code is run on a computer, the computer is enabled to perform the method in any one of the embodiments shown in FIG. 4 to FIG. 22.

According to the method provided in embodiments of this application, this application further provides a system, including the foregoing receiver, reflector, and exciter.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (solid state disc, SSD)), or the like.

The network device and the terminal device in the foregoing apparatus embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
   receiving, by a reflector, W excitation signals; and
   reflecting, by the reflector, data and L reference signals to a receiver, wherein the L reference signals are respectively carried in L excitation signals in the W excitation signals, wherein
   W and L are both integers greater than or equal to 1, and L is less than or equal to W, and wherein the L reference signals are carried in L time domain units, and each of the L time domain units carries one reference signal, and two reference signal symbols carried in two adjacent time domain units are opposite.

2. The method according to claim 1, wherein the W excitation signals comprise T excitation signals, and the T excitation signals do not carry at least one of the reference signal or the data, wherein T is an integer greater than 0.

3. The method according to claim 2, wherein T and L meet one of the following:
T is greater than L, T is equal to L, or T is less than L; and wherein
when T is equal to L, locations of the reference signals and the excitation signals in the T excitation signals in a time domain resource alternately appear.

4. The method according to claim 2, wherein locations of the T excitation signals in a time domain resource are before locations of the L excitation signals in the time domain resource; or locations of the T excitation signals in a time domain resource are after locations of the L excitation signals in the time domain resource; and
wherein an interval between the locations of the T excitation signals in the time domain resource is less than an interval between the locations of the L excitation signals in the time domain resource; or an interval between the locations of the T excitation signals in the time domain resource is greater than an interval between the locations of the L excitation signals in the time domain resource.

5. The method according to claim 1, wherein before the reflecting, by the reflector, data and L reference signals to a receiver, the method further comprises:
receiving, by the reflector, configuration information, wherein the configuration information comprises one or more of the following information:
a format of the reference signal, a location of the reference signal in a time domain resource, a quantity L of the reference signals, a location of an excitation signal that does not carry at least one of the reference signal or the data in the time domain resource, a quantity of excitation signals that do not carry at least one of the reference signal or the data, a location of an excitation signal that carries the reference signal in the time domain resource, a quantity of excitation signals that carry the reference signal, or a demodulation scheme of the data.

6. An apparatus, comprising:
one or more processors; and
a memory coupled to the one or more processors, wherein the memory stores instructions to be executed by the one or more processors, and wherein the instructions, when executed by the one or more processors, instructs the one or more processors to perform operations comprising:
receiving W excitation signals; and
reflecting data and L reference signals to a receiver, wherein the L reference signals are respectively carried in L excitation signals in the W excitation signals, wherein
W and L are both integers greater than or equal to 1, and L is less than or equal to W, wherein the W excitation signals comprise T excitation signals, and the T excitation signals do not carry the reference signal and the T excitation signals do not carry the data, wherein T is an integer greater than 0.

7. The apparatus according to claim 6, wherein T and L meet one of the following:
T is greater than L, T is equal to L, or T is less than L; and wherein when T is equal to L, locations of the reference signals and the excitation signals in the T excitation signals in a time domain resource alternately appear.

8. The apparatus according to claim 6, wherein locations of the T excitation signals in a time domain resource are before locations of the L excitation signals in the time domain resource, or locations of the T excitation signals in a time domain resource are after locations of the L excitation signals in the time domain resource; and
wherein an interval between the locations of the T excitation signals in the time domain resource is less than an interval between the locations of the L excitation signals in the time domain resource, or an interval between the locations of the T excitation signals in the time domain resource is greater than an interval between the locations of the L excitation signals in the time domain resource.

9. The apparatus according to claim 6, wherein the L reference signals are carried in L time domain units, and each of the L time domain units carries one reference signal; and
two reference signal symbols carried in two adjacent time domain units are opposite.

10. The apparatus according to claim 6, wherein the operations comprise:
receiving configuration information, wherein the configuration information comprises one or more of the following information:
a format of the reference signal, a location of the reference signal in a time domain resource, a quantity L of the reference signals, a location of an excitation signal that does not carry at least one of the reference signal or the data in the time domain resource, a quantity of excitation signals that do not carry at least one of the reference signal or the data, a location of an excitation signal that carries the reference signal in the time domain resource, a quantity of excitation signals that carry the reference signal, or a demodulation scheme of the data.

11. A signal transmission method, comprising:
receiving, by a receiver, a plurality of signals, wherein each signal comprises data and L reference signals, and the L reference signals are carried in L excitation signals, wherein the plurality of signals comprise a first signal and a second signal, and time domain units carrying the first signal and the second signal are adjacent; and
demodulating, by the receiver, the plurality of signals, and wherein the demodulating, by the receiver, the plurality of signals comprises: performing, by the receiver, subtraction processing on the first signal and the second signal.

* * * * *